United States Patent
Wen et al.

(10) Patent No.: US 10,891,286 B2
(45) Date of Patent: Jan. 12, 2021

(54) TRANSACTION EXECUTION METHOD, APPARATUS, AND SYSTEM

(71) Applicant: HUAWEI TECHNOLOGIES CO., LTD., Shenzhen (CN)

(72) Inventors: Jijun Wen, Shenzhen (CN); Liangchun Xiong, Shenzhen (CN); Chunxin Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 316 days.

(21) Appl. No.: 15/916,284

(22) Filed: Mar. 9, 2018

(65) Prior Publication Data
US 2018/0196809 A1 Jul. 12, 2018

Related U.S. Application Data

(63) Continuation of application No. PCT/CN2016/107742, filed on Nov. 29, 2016.

(30) Foreign Application Priority Data

Feb. 24, 2016 (CN) .......................... 2016 1 0101424

(51) Int. Cl.
*G06F 16/23* (2019.01)
*G06F 16/00* (2019.01)
*G06F 9/46* (2006.01)

(52) U.S. Cl.
CPC .......... *G06F 16/2386* (2019.01); *G06F 9/466* (2013.01); *G06F 16/00* (2019.01); *G06F 16/2358* (2019.01)

(58) Field of Classification Search
CPC .. G06F 16/283; G06F 16/245; G06F 16/2379; G06F 16/24522; G06F 3/067;
(Continued)

(56) References Cited

U.S. PATENT DOCUMENTS 7,188,111 B2 3/2007 Chen et al.
8,250,111 B2 8/2012 Huras et al.
(Continued)

FOREIGN PATENT DOCUMENTS

CN 101706811 A 5/2010
CN 103186566 A 7/2013
(Continued)

OTHER PUBLICATIONS

Vinay Kanitkar et al: "Efficient Processing of Client Transactions in Real-Time", Distributed and Parallel Databases, Jan. 1, 2005 (Jan. 1, 2005), pp. 39-74, XP055557186.
(Continued)

*Primary Examiner* — Angelica Ruiz
(74) *Attorney, Agent, or Firm* — Kilpatrick Townsend & Stockton LLP

(57) ABSTRACT

A transaction execution method, apparatus, and system is disclosed. The method is applied to a CN of an OLTP cluster database, and the method includes: receiving a page request message sent by a first PN, where the first PN has a first transaction configured, the first transaction includes at least one operation, and the page request message includes an identifier of a to-be-processed page and an identifier of the first PN; if the to-be-processed page indicated by the identifier of the to-be-processed page is the same as a hot page in a preset hot page set, determining a target operation corresponding to the to-be-processed page, where the preset hot page set includes at least one hot page; executing the target operation on the to-be-processed page to obtain an execution result; and sending the execution result to the first PN indicated by the identifier of the first PN.

20 Claims, 13 Drawing Sheets

(58) Field of Classification Search
CPC ............. G06F 11/1658; G06F 16/2386; G06F 2201/87; G06F 3/0607; G06F 16/284; G06F 16/951
USPC ........... 707/600–831, 899, 999.001–999.206
See application file for complete search history.

(56) References Cited

U.S. PATENT DOCUMENTS

| | | | |
|---|---|---|---|
| 9,244,988 B2 | 1/2016 | Hegde et al. | |
| 2006/0224594 A1 | 10/2006 | Goyal et al. | |
| 2010/0145910 A1* | 6/2010 | Zhao | G06F 11/1658 707/620 |
| 2010/0191884 A1* | 7/2010 | Holenstein | G06F 11/2094 710/200 |
| 2011/0131193 A1 | 6/2011 | Pasupuleti et al. | |
| 2013/0254224 A1 | 9/2013 | Hegde et al. | |
| 2015/0081658 A1 | 3/2015 | Meyles et al. | |
| 2015/0213077 A1 | 7/2015 | Hu et al. | |
| 2015/0339366 A1 | 11/2015 | Laiho et al. | |
| 2017/0329852 A1 | 11/2017 | Li et al. | |
| 2018/0196809 A1* | 7/2018 | Wen | G06F 9/466 |
| 2020/0012734 A1* | 1/2020 | Lee | G06F 16/2455 |

FOREIGN PATENT DOCUMENTS

| | | |
|---|---|---|
| CN | 103647834 A | 3/2014 |
| CN | 103858121 A | 6/2014 |
| CN | 104462225 A | 3/2015 |
| CN | 104573112 A | 4/2015 |
| CN | 105339939 A | 2/2016 |

OTHER PUBLICATIONS

Theodore Johnson et al: "2Q: A Low Overhead High Performance Buffer Management Replacement Algorithm", Sep. 1, 1994 (Sep. 1, 1994), pp. 439-450. XP055677625.

* cited by examiner

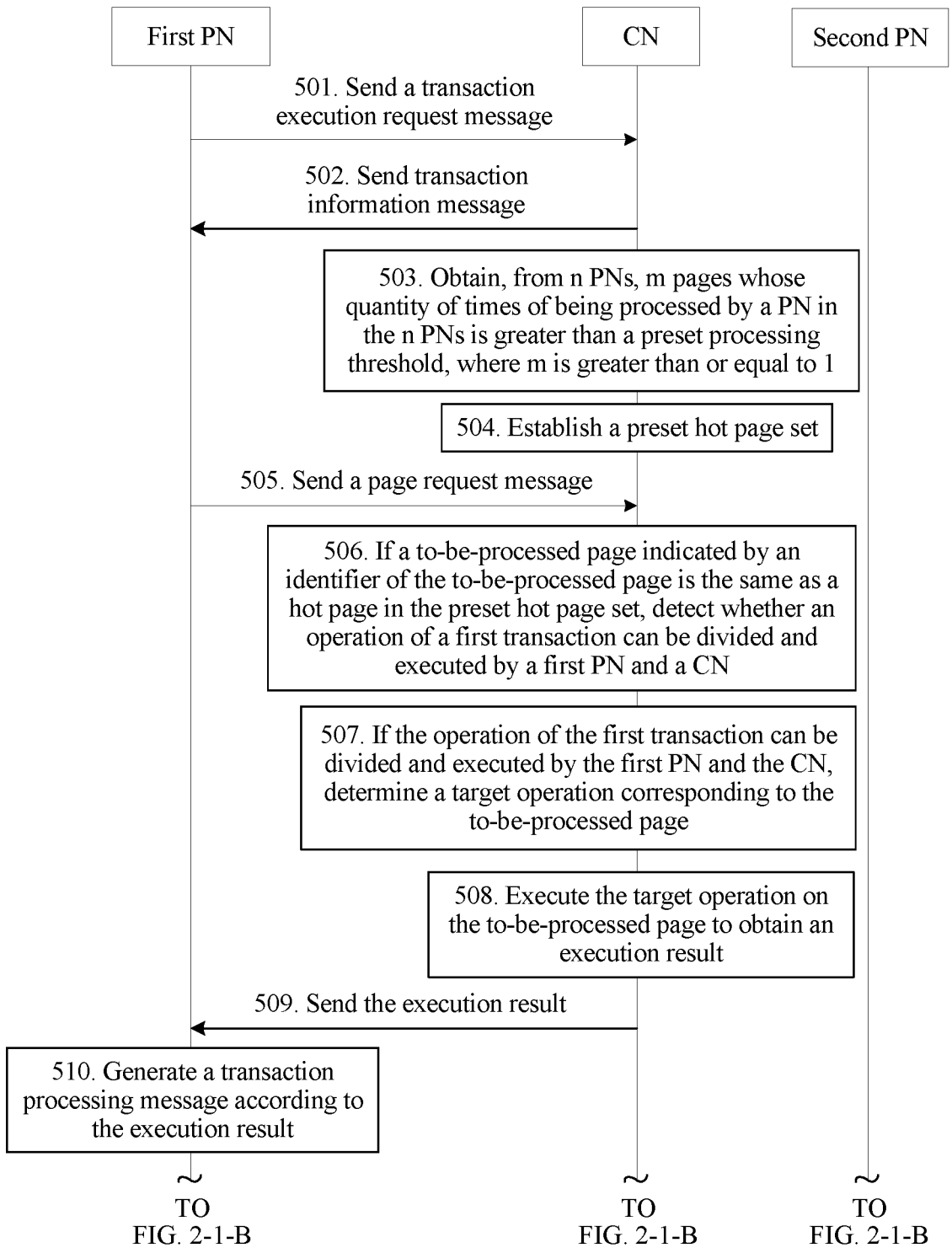
FIG. 2-1-A

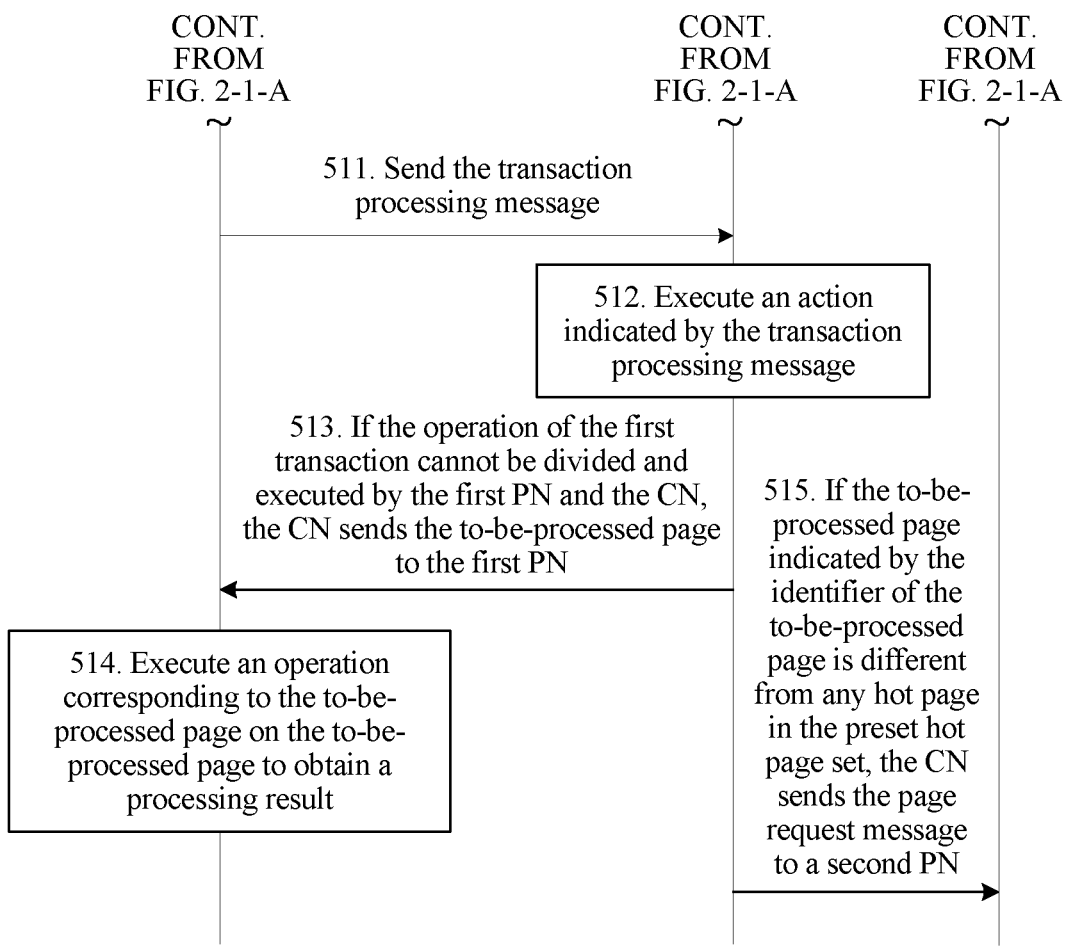
FIG. 2-1-B

US 10,891,286 B2

TRANSACTION EXECUTION METHOD, APPARATUS, AND SYSTEM

CROSS-REFERENCE TO RELATED APPLICATIONS

This application is a continuation of International Application No. PCT/CN2016/107742, filed on Nov. 29, 2016, which claims priority to Chinese Patent Application No. 201610101424.6, filed on Feb. 24, 2016. The disclosures of the aforementioned applications are hereby incorporated by reference in their entireties.

TECHNICAL FIELD

The present application relates to the computer field, and in particular, to a transaction execution method, apparatus, and system.

BACKGROUND

An online transaction processing (OLTP) cluster database is used for executing a large quantity of relatively small transactions (a relatively small transaction is a transaction that has a relatively short execution time and that does not require complex calculation) of a banking or aviation industry or the like. A transaction is an operation sequence. There are two execution cases: All operations in the operation sequence are executed or none of the operations in the operation sequence is executed. When all the operations in the transaction are successfully executed, the OLTP cluster database submits the transaction (that is, saves modification performed by all the operations) to save an execution result; or when an operation in the transaction is unsuccessfully executed, the OLTP cluster database rolls back the transaction to cancel modification performed by all previous successfully executed operations. An important indicator for measuring a cluster capability of the OLTP cluster database is a transaction execution capability. Therefore, a transaction execution method is needed to improve the transaction execution capability. The OLTP cluster database includes a coordinator node (CN) and at least one data processing node (PN). The coordinator node is used to manage and coordinate data access consistency and accuracy issues and the like of all data processing nodes in the entire database.

There is a transaction execution method in the prior art. In the method, after receiving a page request message sent by a PN, a CN in an OLTP cluster database (for example, a Gaussian cluster database) detects that a requested page is held by another PN, and the CN obtains the corresponding page from the another PN, and sends the obtained corresponding page to the PN that requests the corresponding page. Then, the PN executes a corresponding operation on the corresponding page, for example, modifies or deletes a record in a line on the corresponding page according to the corresponding operation. Finally, the PN determines, according to an execution result, whether to submit a transaction to the CN.

In a scenario with high concurrency and intense conflicts (that is, with multiple transactions concurrently executed), the foregoing method imposes relatively large page transfer overheads, and transaction execution efficiency is relatively low. Therefore, a transaction execution capability is relatively low, and OLTP cluster database performance is relatively poor.

SUMMARY

To resolve a problem in the prior art that a transaction execution capability is relatively low and OLTP cluster database performance is relatively poor, the present application provides a transaction execution method, apparatus, and system. The technical solutions are as follows:

According to a first aspect, a transaction execution method is provided, applied to a coordinator node CN of an online transaction processing OLTP cluster database, where the OLTP cluster database includes n data processing nodes PNs and one CN, where n is greater than or equal to 1; and the method includes: receiving a page request message sent by a first PN, where the first PN is any PN in the n PNs, the first PN has a first transaction configured, the first transaction includes at least one operation, and the page request message includes an identifier of a to-be-processed page and an identifier of the first PN; determining a target operation corresponding to the to-be-processed page if the to-be-processed page indicated by the identifier of the to-be-processed page is the same as a hot page in a preset hot page set, where the preset hot page set includes at least one hot page, the hot page is a page that has been processed by a PN in the n PNs a number of times that is greater than a preset processing threshold, and the target operation is an operation selected from the at least one operation according to the hot page that is the same as the to-be-processed page; executing the target operation on the to-be-processed page to obtain an execution result; and sending the execution result to the first PN indicated by the identifier of the first PN, so that the first PN submits the first transaction to the CN or rolls back the first transaction according to the execution result.

If a to-be-processed page indicated by an identifier of the to-be-processed page is the same as a hot page in a preset hot page set, a CN can execute a target operation on the to-be-processed page, so that the to-be-processed page does not need to be frequently transferred between a PN and the CN, thereby reducing page transfer overheads, and improving transaction execution efficiency. Therefore, a transaction execution capability and OLTP cluster database performance are improved.

With reference to the first aspect, in a first possible implementation of the first aspect, the determining a target operation corresponding to the to-be-processed page if the to-be-processed page indicated by the identifier of the to-be-processed page is the same as a hot page in a preset hot page set includes: if the to-be-processed page indicated by the identifier of the to-be-processed page is the same as a hot page in the preset hot page set, detecting whether an operation of the first transaction is divisible and executable by the first PN and the CN; and if the operation of the first transaction is divisible and executable by the first PN and the CN, determining the target operation corresponding to the to-be-processed page.

If an operation of a first transaction is divisible and executable by a first PN and a CN, the CN determines a target operation corresponding to a to-be-processed page, and then executes the target operation on the to-be-processed page, so as to ensure that the first transaction is accurately executed. The operation of the first transaction is divisible and executable by the first PN and the CN, that is, some operations in multiple operations included in the first transaction can be executed by the first PN, and remaining operations in the multiple operations can be executed by the CN.

With reference to the first aspect, in a second possible implementation of the first aspect, the executing the target operation on the to-be-processed page to obtain an execution result includes: adding the target operation to a waiting queue, where the waiting queue includes an operation to be executed on the to-be-processed page; determining a priority of the first transaction; determining, according to a preset correspondence between an operation and a transaction identifier and the priority of the first transaction, an obtaining sequence of obtaining the operation from the waiting queue; executing the target operation on the to-be-processed page, where the target operation is obtained from the waiting queue according to the obtaining sequence; and adding the executed target operation to a completion queue, where the completion queue includes a completed operation executed on the to-be-processed page.

A CN can determine, according to a transaction priority, an obtaining sequence of obtaining an operation from a waiting queue, and obtain a target operation from the waiting queue according to the obtaining sequence to execute the target operation on a to-be-processed page, so as to ensure that transactions are effectively executed. When establishing a correspondence between an operation and a transaction identifier, the CN may allocate a priority to each transaction. The priority may be represented by using a number, and a larger number indicates a higher transaction priority. Moreover, in addition to determining, according to the transaction priority, the obtaining sequence of obtaining the operation from the waiting queue, and further determining a sequence of executing operations, the CN may determine, according to another priority rule such as complexity of an operation process, the obtaining sequence of obtaining the operation from the waiting queue, and further determine the sequence of executing operations, so as to complete processing on the to-be-processed page.

With reference to the second possible implementation of the first aspect, in a third possible implementation of the first aspect, the to-be-processed page includes at least two lines of records, and the method further includes: after executing the target operation on the to-be-processed page, executing at least one other operation in the waiting queue on the to-be-processed page, where the other operation and the target operation are for processing records in different lines on the to-be-processed page, and a transaction priority corresponding to the other operation is lower than the priority of the first transaction corresponding to the target operation.

If operations of different transactions are for processing records in different lines on a to-be-processed page, after an operation of a previous transaction is executed on the to-be-processed page, an operation of a next transaction (a priority of the next transaction is lower than a priority of the previous transaction) may be executed on the to-be-processed page, without waiting for submission of the previous transaction, so that a transaction execution capability and OLTP cluster database performance are improved.

With reference to the first aspect, in a fourth possible implementation of the first aspect, the method further includes: obtaining, from the n PNs, m pages whose quantity of times of being processed by a PN in the n PNs is greater than the preset processing threshold, where m is greater than or equal to 1; and establishing the preset hot page set, where the preset hot page set includes the m pages.

A quantity of times that a page is selected and processed by a PN may be counted. When the quantity times that a page is selected and processed by a PN is greater than a preset processing threshold, the page may be used as a hot page. Further, the quantity of times that a page is selected and processed by a PN within a time period may be counted by using a time window. When the quantity of times that a page is processed by a PN is greater than the preset processing threshold, the page may be used as a hot page. Optionally, when establishing a preset hot page set, a CN may further establish a correspondence between a hot page and an operation. The CN establishes the preset hot page set, so that if a to-be-processed page indicated by an identifier of the to-be-processed page is the same as a hot page in the preset hot page set, the CN executes a target operation on the to-be-processed page.

With reference to the first aspect, in a fifth possible implementation of the first aspect, the page request message further includes an identifier of the first transaction; and the determining a target operation corresponding to the to-be-processed page includes: determining, according to a preset correspondence between a hot page and an operation, at least one operation corresponding to the to-be-processed page, where the preset correspondence between a hot page and an operation records an operation corresponding to each hot page in the preset hot page set; determining, according to a preset correspondence between an operation and a transaction identifier, at least one operation corresponding to the identifier of the first transaction; and determining an operation common to the at least one operation corresponding to the to-be-processed page and the at least one operation corresponding to the identifier of the first transaction as the target operation.

A CN determines a target operation according to at least one operation corresponding to a to-be-processed page and at least one operation corresponding to an identifier of a first transaction, and further executes the target operation on the to-be-processed page.

With reference to the first aspect, in a sixth possible implementation of the first aspect, after the sending the execution result to the first PN indicated by the identifier of the first PN, the method further includes: receiving a transaction processing message sent by the first PN, where the transaction processing message is a transaction submission message or a transaction rollback message, the transaction submission message indicating that the first transaction needs to be submitted to the CN, the transaction rollback message indicating that the first transaction needs to be rolled back, and the transaction processing message is generated by the first PN according to the execution result; and executing an action indicated by the transaction processing message.

A PN generates a transaction processing message according to an execution result of a to-be-processed page, and then sends the transaction processing message to a CN, so that the CN executes an action indicated by the transaction processing message, to complete transaction submission or a transaction rollback.

With reference to a fourth possible implementation of the first aspect, in a seventh possible implementation of the first aspect, the method further includes: detecting, every a preset time period, whether a quantity of times that a first page on the n PNs is processed by a PN in the n PNs is greater than the preset processing threshold, where the first page is any page on the n PNs; and if the quantity of times that the first page is processed by a PN in the n PNs is greater than the preset processing threshold, storing the first page in the preset hot page set.

A CN can periodically determine a new hot page, and store a new hot page generated on a PN in a preset hot page set in time, so that the CN processes more hot pages, thereby reducing page transfer overheads, and improving transaction execution efficiency. Therefore, a transaction execution capability and OLTP cluster database performance are improved.

With reference to a fourth possible implementation of the first aspect, in an eighth possible implementation of the first aspect, the method further includes: detecting, every a preset time period, whether a quantity of times that a second page in the preset hot page set is processed by the CN is greater than the preset processing threshold, where the second page is any page in the preset hot page set; and if the quantity of times that the second page is processed by the CN is not greater than the preset processing threshold, removing the second page from the preset hot page set.

A CN can periodically remove a non-hot page from a preset hot page set, so as to improve a transaction execution capability and OLTP cluster database performance.

With reference to a first possible implementation of the first aspect, in a ninth possible implementation of the first aspect, the method further includes: if the operation of the first transaction is not divisible or executable by the first PN and the CN, sending the to-be-processed page to the first PN, so that the first PN executes an operation corresponding to the to-be-processed page on the to-be-processed page to obtain a processing result.

If an operation of a first transaction is not divisible or executable by a first PN and a CN, the CN sends a to-be-processed page to the first PN, and then the first PN executes an operation corresponding to the to-be-processed page on the to-be-processed page, so as to ensure that the first transaction is accurately executed.

Optionally, if the transaction processing message is the transaction submission message, the method further includes: releasing a resource occupied by the target operation. After a transaction is submitted, the CN releases the resource occupied by the target operation, so as to save a resource.

According to a second aspect, a transaction execution method is provided, applied to a first data processing node PN of an online transaction processing OLTP cluster database, where the OLTP cluster database includes n PNs and one coordinator node CN, where n is greater than or equal to 1, and the first PN is any PN in the n PNs; and the method includes: sending a page request message to the CN, where the first PN has a first transaction configured, the first transaction includes at least one operation, and the page request message includes an identifier of a to-be-processed page and an identifier of the first PN; receiving an execution result, of the to-be-processed page, sent by the CN, where if the to-be-processed page indicated by the identifier of the to-be-processed page is the same as a hot page in a preset hot page set, the execution result is obtained after a target operation is executed on the to-be-processed page; and submitting the first transaction to the CN or rolling back the first transaction according to the execution result.

A first PN sends a page request message to a CN, and if a to-be-processed page indicated by an identifier of the to-be-processed page is the same as a hot page in a preset hot page set, a CN executes a target operation on the to-be-processed page, so that a first transaction on the first PN is divisible and executable by the first PN and the CN, thereby improving transaction execution efficiency of the first PN. Therefore, a transaction execution capability and OLTP cluster database performance are improved.

With reference to the second aspect, in a first possible implementation of the second aspect, the submitting the first transaction to the CN or rolling back the first transaction according to the execution result includes: generating a transaction processing message according to the execution result, where the transaction processing message is a transaction submission message or a transaction rollback message, the transaction submission message indicating that the first transaction needs to be submitted to the CN, and the transaction rollback message indicating that the first transaction needs to be rolled back; and sending the transaction processing message to the CN, so that the CN executes an action indicated by the transaction processing message.

A first PN may establish a hot page processing structure in advance, and the hot page processing structure is used to store an execution result, of a to-be-processed page, subsequently sent by a CN. The first PN can generate a transaction processing message according to an execution result in the hot page processing structure, and send the transaction processing message to the CN, so that the CN executes an action indicated by the transaction processing message, to complete transaction execution. There may be three cases in which the first PN generates the transaction processing message according to the execution result in the hot page processing structure. In a first case, if the first PN determines, according to the execution result in the hot page processing structure, that all to-be-processed pages corresponding to a first transaction are successfully processed by the CN, the first PN generates a transaction submission message. In a second case, if the first PN determines, according to the execution result in the hot page processing structure, that the CN fails to process a to-be-processed page, the first PN generates a transaction rollback message. In a third case, if the first PN fails to receive, in a first preset time period, execution results of all to-be-processed pages that are corresponding to a first transaction and that are processed by the CN, the first PN may detect whether an execution result of a remaining to-be-processed page processed by the CN is received in a second preset time period, and if the first PN receives, in the second preset time period, the execution result of the remaining to-be-processed page processed by the CN, the first PN generates a transaction processing message according to the execution result; or if the first PN still fails to receive, in the second preset time period, the execution result of the remaining to-be-processed page processed by the CN, the first PN generates a transaction rollback message.

With reference to the second aspect, in a second possible implementation of the second aspect, the method further includes: receiving the to-be-processed page sent by the CN, where the to-be-processed page indicated by the identifier of the to-be-processed page is the same as a hot page in the preset hot page set, and an operation of the first transaction is not divisible or executable by the first PN and the CN; and executing an operation corresponding to the to-be-processed page on the to-be-processed page to obtain a processing result.

If an operation of a first transaction is not divisible or executable by a first PN and a CN, the CN sends a to-be-processed page to the first PN, and then the first PN executes an operation corresponding to the to-be-processed page on the to-be-processed page, so as to ensure that the first transaction is accurately executed.

According to a third aspect, a transaction execution apparatus is provided, applied to a coordinator node CN of an online transaction processing OLTP cluster database, where the OLTP cluster database includes n data processing nodes PNs and one CN, where n is greater than or equal to 1; and the apparatus includes: a receiving unit, configured to receive a page request message sent by a first PN, where the first PN is any PN in the n PNs, the first PN has a first transaction configured, the first transaction includes at least one operation, and the page request message includes an identifier of a to-be-processed page and an identifier of the first PN; a determining unit, configured to: if the to-be-processed page indicated by the identifier of the to-beprocessed page is the same as a hot page in a preset hot page set, determine a target operation corresponding to the to-be-processed page, where the preset hot page set includes at least one hot page, the hot page is a page that has been processed by a PN in the n PNs a number of times that is greater than a preset processing threshold, and the target operation is an operation selected from the at least one operation according to the hot page that is the same as the to-be-processed page; an execution unit, configured to execute the target operation on the to-be-processed page to obtain an execution result; and a sending unit, configured to send the execution result of the to-be-processed page to the first PN indicated by the identifier of the first PN, so that the first PN submits the first transaction to the CN or rolls back the first transaction according to the execution result.

Optionally, the apparatus further includes: a release unit, configured to release a resource occupied by the target operation.

For a specific operation process of the apparatus and the units described in the third aspect, refer to implementations corresponding to the first aspect.

According to a fourth aspect, a transaction execution apparatus is provided, applied to a first data processing node PN of an online transaction processing OLTP cluster database, where the OLTP cluster database includes n PNs and one coordinator node CN, where n is greater than or equal to 1, and the first PN is any PN in the n PNs; and the apparatus includes: a sending unit, configured to send a page request message to the CN, where the first PN has a first transaction configured, the first transaction includes at least one operation, and the page request message includes an identifier of a to-be-processed page and an identifier of the first PN; a receiving unit, configured to receive an execution result, of the to-be-processed page, sent by the CN, where if the to-be-processed page indicated by the identifier of the to-be-processed page is the same as a hot page in a preset hot page set, the execution result is obtained after a target operation is executed on the to-be-processed page; and a processing unit, configured to submit the first transaction to the CN or roll back the first transaction according to the execution result.

For a specific operation process of the apparatus and the units described in the fourth aspect, refer to implementations corresponding to the second aspect.

According to a fifth aspect, a transaction execution apparatus is provided, applied to a coordinator node CN of an online transaction processing OLTP cluster database, where the OLTP cluster database includes n data processing nodes PNs and one CN, where n is greater than or equal to 1; and the apparatus includes a processor, a memory, a network interface, and a bus, the bus is configured to connect the processor, the memory, and the network interface, the processor is configured to execute a program stored in the memory, and the program includes the transaction execution method according to the first aspect.

According to a sixth aspect, a transaction execution apparatus is provided, applied to a first data processing node PN of an online transaction processing OLTP cluster database, where the OLTP cluster database includes n PNs and one coordinator node CN, where n is greater than or equal to 1, and the first PN is any PN in the n PNs; and the apparatus includes a processor, a memory, a network interface, and a bus, the bus is configured to connect the processor, the memory, and the network interface, the processor is configured to execute a program stored in the memory, and the program includes the transaction execution method according to the second aspect.

According to a seventh aspect, a transaction execution system is provided, including a coordinator node CN and a first data processing node PN. The CN includes the transaction execution apparatus according to the third aspect, and the first PN includes the transaction execution apparatus according to the fourth aspect.

According to an eighth aspect, a transaction execution system is provided, including a coordinator node CN and a first data processing node PN. The CN includes the transaction execution apparatus according to the fifth aspect, and the first PN includes the transaction execution apparatus according to the sixth aspect.

Beneficial effects of the technical solutions provided in the present application are as follows:

According to the transaction execution method, apparatus, and system provided in the present application, after a CN receives a page request message sent by a PN, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, and improving transaction execution efficiency. Therefore, a transaction execution capability and OLTP cluster database performance are improved.

BRIEF DESCRIPTION OF DRAWINGS

To describe the technical solutions in embodiments in accordance with the present disclosure more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1-2 is a flowchart of a transaction execution method according to an embodiment in accordance with the present disclosure;

FIG. 2-1-A and FIG. 2-1-B are a flowchart of a transaction execution method according to an embodiment in accordance with the present disclosure;

FIG. 2-2 is a flowchart of determining, by a CN, a target operation corresponding to a to-be-processed page in the embodiment shown in FIG. 2-1-A and FIG. 2-1-B;

FIG. 2-3 is a flowchart of executing, by a CN, a target operation on a to-be-processed page to obtain an execution result in the embodiment shown in FIG. 2-1-A and FIG. 2-1-B;

FIG. 2-4 is a schematic diagram of an implementation environment related to a transaction execution method in the prior art;

FIG. 2-5 is a flowchart of a transaction execution method in the prior art;

FIG. 2-6 is a schematic diagram of another implementation environment related to a transaction execution method in the prior art;

FIG. 2-7 is a schematic diagram of an implementation environment related to a transaction execution method according to an embodiment in accordance with the present disclosure;

FIG. 2-8 is a schematic diagram corresponding to transaction execution in the implementation environment shown in FIG. 2-7;

FIG. 3-1 is a schematic structural diagram of a transaction execution apparatus according to an embodiment in accordance with the present disclosure;

FIG. 3-2 is a schematic structural diagram of another transaction execution apparatus according to an embodiment in accordance with the present disclosure;

FIG. 4 is a schematic structural diagram of still another transaction execution apparatus according to an embodiment in accordance with the present disclosure;

FIG. 5 is a schematic structural diagram of a transaction execution apparatus according to an embodiment in accordance with the present disclosure; and FIG. 6 is a schematic structural diagram of a transaction execution apparatus according to an embodiment in accordance with the present disclosure.

Embodiments in accordance with the present disclosure are clearly shown by using the foregoing accompanying drawings, and the following provides more detailed description. The accompanying drawings and text description are not intended for limiting a scope of a conception of the present application in any manner, but for describing a concept of the present application for a person skilled in the art with reference to specific embodiments.

DESCRIPTION OF EMBODIMENTS

To make the objectives, technical solutions, and advantages of the present application clearer, the following further describes embodiments in accordance with the present disclosure in detail with reference to the accompanying drawings.

Figure 1:
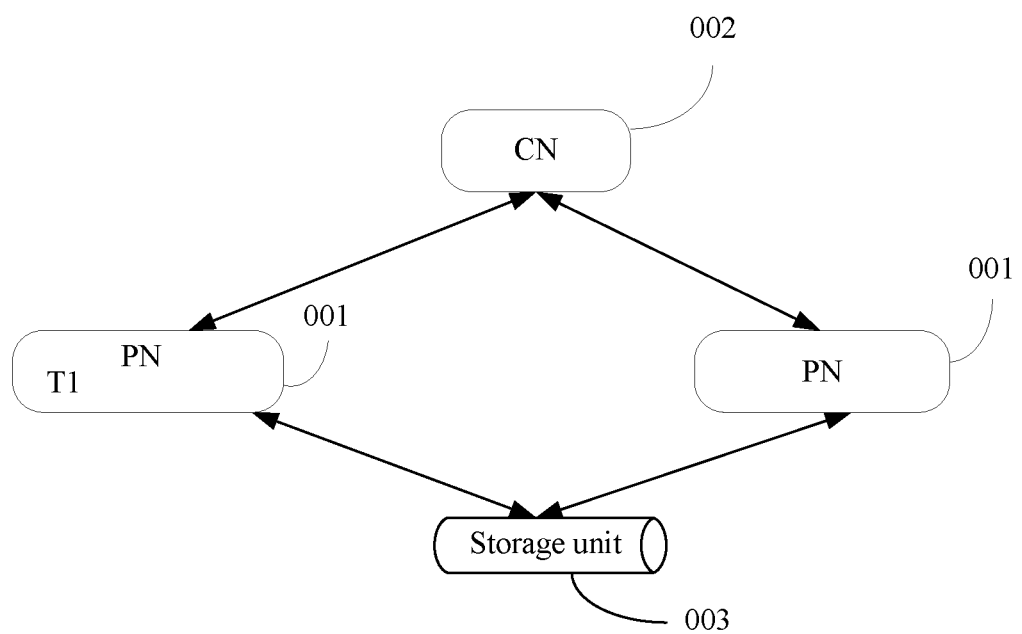
FIG. 1-1 is a schematic structural diagram of an OLTP cluster database related in embodiments in accordance with the present disclosure.
Figures 1, 2:
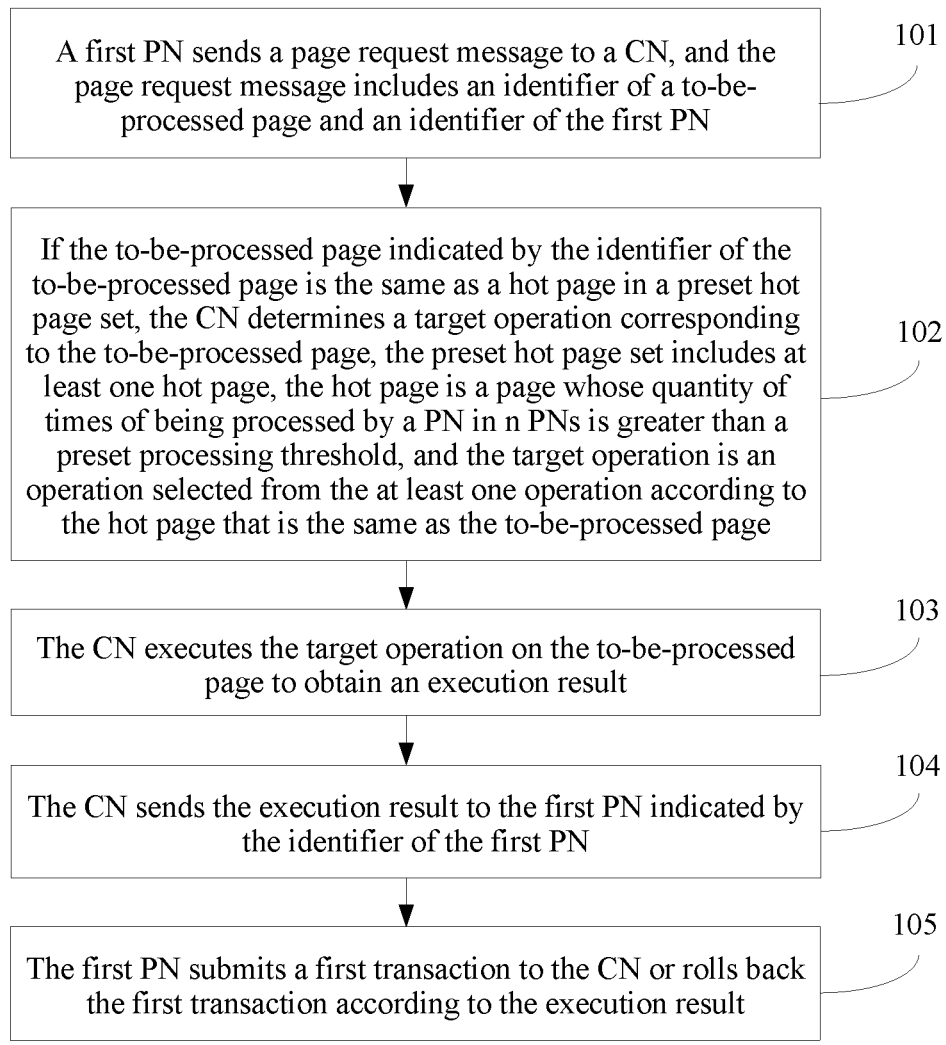

FIG. 1-1 is a schematic structural diagram of an OLTP cluster database in embodiments in accordance with the present disclosure. The OLTP cluster database may include n PNs 001 and one CN 002, where n is greater than or equal to 1. In FIG. 1-1, a quantity of PNs 001 is 2. The CN 002 is used to manage and coordinate data access consistency and accuracy issues and the like of all PNs 001 in the entire database. The n PNs 001 share one storage unit 003. Each PN 001 may have at least one transaction configured, and each transaction includes at least one operation. When a first transaction T1 (the first transaction is any transaction in the at least one transaction) on a first PN 001 (a first PN is any PN in the n PNs) needs to be executed, as shown in FIG. 1-2, the execution process may include the following steps.

Step 101: The first PN sends a page request message to a CN, and the page request message includes an identifier of a to-be-processed page and an identifier of the first PN.

The first PN 001 sends a page request message to the CN 002, and the page request message includes an identifier of a to-be-processed page and an identifier of the first PN 001.

Step 102: If the to-be-processed page indicated by the identifier of the to-be-processed page is the same as a hot page in a preset hot page set, the CN determines a target operation corresponding to the to-be-processed page. The preset hot page set includes at least one hot page, the hot page is a page that has been processed by a PN in the n PNs a number of times that is greater than a preset processing threshold, and the target operation is an operation selected from the at least one operation according to the hot page that is the same as the to-be-processed page.

If the to-be-processed page indicated by the identifier of the to-be-processed page is the same as a hot page in the preset hot page set, the CN 002 determines a target operation corresponding to the to-be-processed page. A hot page included in the preset hot page set may be a page whose quantity of times of being processed by a PN in the n PNs is greater than the preset processing threshold, or may be a page whose quantity of times of being processed by at least two PNs in then PNs is greater than the preset processing threshold. The quantity of times is a counted quantity of all times that the page is processed.

Step 103: The CN executes the target operation on the to-be-processed page to obtain an execution result.

The CN 002 executes the target operation on the to-be-processed page to obtain an execution result.

Step 104: The CN sends the execution result to the first PN indicated by the identifier of the first PN.

The CN 002 sends the execution result to the first PN 001 indicated by the identifier of the first PN.

Step 105: The first PN submits the first transaction to the CN or rolls back the first transaction according to the execution result.

The first PN 001 submits the first transaction to the CN or rolls back the first transaction according to the execution result.

FIG. 2-1-A and FIG. 2-1-B are a flowchart of a transaction execution method according to an embodiment in accordance with the present disclosure. In this embodiment, that the transaction execution method is applied to the OLTP cluster database shown in FIG. 1-1 is used as an example for description. The transaction execution method may include the following steps.

Step 501: A first PN sends a transaction execution request message to a CN.

In a possible implementation, the first PN sends the transaction execution request message to the CN, and the first PN is any PN in the n PNs. The first PN has a first transaction configured, and the transaction execution request message is generated by the first transaction. The first transaction includes at least one operation. For example, the first transaction includes five operations, and there are two execution cases: All the five operations are executed or none of the five operations is executed. When all the five operations are successfully executed, the OLTP cluster database submits the transaction to save execution results of all the operations; or when an operation in the five operations is unsuccessfully executed, the OLTP cluster database rolls back the transaction to cancel modification performed by all previous successfully executed operations. For description of a specific process of step 501, refer to the prior art.

Step 502: The CN sends a transaction information message to the first PN according to the transaction execution request message.

In a possible implementation, after the first PN sends the transaction execution request message to the CN, the CN sends the transaction information message to the first PN according to the transaction execution request message. The transaction information message includes an identifier of the first transaction. A transaction identifier is used to distinguish between different transactions. For description of a specific process of step 502, refer to the prior art.

Step 503: The CN obtains, from the n PNs, m pages that has been processed by a PN in the n PNs a number of times that is greater than a preset processing threshold, where m is greater than or equal to 1.

In a possible implementation, as shown in FIG. 1-1, a CN 002 may first obtain, from n PNs 001, m pages whose quantity of times of being processed by a PN in the n PNs is greater than the preset processing threshold, so that the CN 002 establishes a preset hot page set including the m pages. It should be noted that a hot page may be determined by counting a quantity of times that a page is selected and processed by a PN. Specifically, when a quantity of times that a page is processed by a PN is greater than the preset processing threshold, the page is used as a hot page. Alternatively, the quantity of times that a page is selected and processed by a PN within a time period may be counted by using a time window. When the quantity of times that a page is processed by a PN is greater than the preset processing threshold, the page may be used as a hot page. A manner of determining a page on a PN as a hot page is not limited in this embodiment in accordance with the present disclosure. It should be noted that step 503 may also be executed before step 501.

Step 504: The CN establishes a preset hot page set.

In a possible implementation, the CN establishes a preset hot page set, and the preset hot page set includes the m pages. It is assumed that, in step 503, the CN obtains, from the n PNs, three pages that have been processed by a PN in the n PNs a number of times that is greater than the preset processing threshold, and the three pages are respectively y1, y2, and y3, the CN determines the three pages as hot pages. The CN establishes a preset hot page set, and the preset hot page set includes y1, y2, and y3.

It should be noted that when establishing the preset hot page set according to the m pages, the CN may further establish a correspondence between a hot page and an operation. The correspondence between a hot page and an operation records an operation corresponding to each hot page in the preset hot page set. For example, the correspondence between a hot page and an operation may be listed in Table 1. In Table 1, the hot page y1 corresponds to operations p11, p12, and p13, the hot page y2 corresponds to operations p21, p22, p23, and p24, and the hot page y3 corresponds to operations p31 and p32. Step 503 and step 504 may also be executed before step 501.

TABLE 1

| Hot page | Operation |
|---|---|
| y1 | p11, p12, and p13 |
| y2 | p21, p22, p23, and p24 |
| y3 | p31 and p32 |

Step 505: The first PN sends a page request message to the CN.

The first PN may send the page request message to the CN according to the transaction information message. The page request message includes an identifier of a to-be-processed page and an identifier of the first PN. It is assumed that the to-be-processed page is y1 in Table 1, and the first PN is N1, the identifier of the to-be-processed page may be y1, and the identifier of the first PN may be N1. The page request message sent by the first PN to the CN may include the identifier y1 of the to-be-processed page and the identifier N1 of the first PN. For description of a specific process of step 505, refer to the prior art.

Step 506: If a to-be-processed page indicated by an identifier of the to-be-processed page is the same as a hot page in the preset hot page set, the CN detects whether an operation of a first transaction is divisible and executable by the first PN and the CN.

In a possible implementation, if the to-be-processed page indicated by the identifier of the to-be-processed page is the same as a hot page in the preset hot page set, the CN detects whether an operation of the first transaction is divisible and executable by the first PN and the CN, that is, detects whether some operations in multiple operations included in the first transaction can be executed by the first PN, and remaining operations in the multiple operations can be executed by the CN. If the operation of the first transaction is divisible and executable by the first PN and the CN, it indicates that the to-be-processed page is suitable for being executed by the CN. If the operation of the first transaction is not divisible or executable by the first PN and the CN, it indicates that the to-be-processed page is unsuitable for being executed by the CN. If the operation of the first transaction is divisible and executable by the first PN and the CN, step 507 is executed. If the operation of the first transaction is not divisible or executable by the first PN and the CN, step 513 is executed. Optionally, the CN may detect, according to a function in a query statement submitted by a user, whether the operation of the first transaction is divisible and executable by the first PN and the CN.

For example, it is assumed that the first transaction includes two operations p11 and p8, the preset hot page set includes three hot pages y1, y2, and y3, as listed in Table 1, the hot page y1 corresponds to the operations p11, p12, and p13, the hot page y2 corresponds to the operations p21, p22, p23, and p24, and the hot page y3 corresponds to the operations p31 and p32. If the identifier of the to-be-processed page included in the page request message sent by the first PN to the CN is y1, the to-be-processed page indicated by the identifier of the to-be-processed page is y1. The to-be-processed page indicated by the identifier of the to-be-processed page is the same as a hot page in the preset hot page set, and the CN may detect, according to a function in a query statement submitted by a user, whether p11 can be executed by the CN, and whether p8 can be executed by the first PN. For example, when the function is a random function, the CN may determine that the operation of the first transaction is not divisible or executable by the first PN and the CN.

If the to-be-processed page indicated by the identifier of the to-be-processed page is different from any hot page in the preset hot page set, step 515 is executed.

Step 507: If the operation of the first transaction is divisible and executable by the first PN and the CN, the CN determines a target operation corresponding to the to-be-processed page.

In a possible implementation, if the operation of the first transaction is divisible and executable by the first PN and the CN, the CN determines the target operation corresponding to the to-be-processed page. The target operation is an operation selected from the at least one operation according to the hot page that is the same as the to-be-processed page. The page request message may further include the identifier of the first transaction. Optionally, as shown in FIG. 2-2, step 507 may include the following steps.

Step 5071: Determine, according to a preset correspondence between a hot page and an operation, at least one operation corresponding to the to-be-processed page.

In a possible implementation, the at least one operation corresponding to the to-be-processed page may be determined according to the correspondence that is between a hot page and an operation and that is established in step 504. Table 1 is used as an example. The to-be-processed page is y1, and it may be obtained from Table 1 that the to-be-processed page y1 corresponds to three operations, and the three operations are respectively p11, p12, and p13.

Step 5072: Determine, according to a preset correspondence between an operation and a transaction identifier, at least one operation corresponding to the identifier of the first transaction.

The correspondence between an operation and a transaction identifier is pre-established by the CN. For example, the correspondence between an operation and a transaction identifier may be listed in Table 2. In Table 2, the identifier T1 of the first transaction corresponds to three operations p11, p23, and p8, an identifier T2 of a second transaction corresponds to two operations p12 and p32, and an identifier T3 of a third transaction corresponds to three operations p41, p51, and p61.

TABLE 2

| Transaction identifier | Operation |
| --- | --- |
| T1 | p11, p23, and p8 |
| T2 | p12 and p32 |
| T3 | p41, p51, and p61 |

Step 5073: Determine an operation common to the at least one operation corresponding to the to-be-processed page and the at least one operation corresponding to the identifier of the first transaction as the target operation.

Table 1 and Table 2 are used as examples. The to-be-processed page y1 corresponds to three operations p11, p12, and p13, and the identifier T1 of the first transaction corresponds to three operations p11, p23, and p8. Therefore, an intersection set between the three operations corresponding to the to-be-processed page y1 and the three operations corresponding to the identifier T1 of the first transaction may be obtained, and an operation in the intersection set is used as the target operation, that is, p11 is determined as the target operation.

Step 508: The CN executes the target operation on the to-be-processed page to obtain an execution result.

Figure 2:
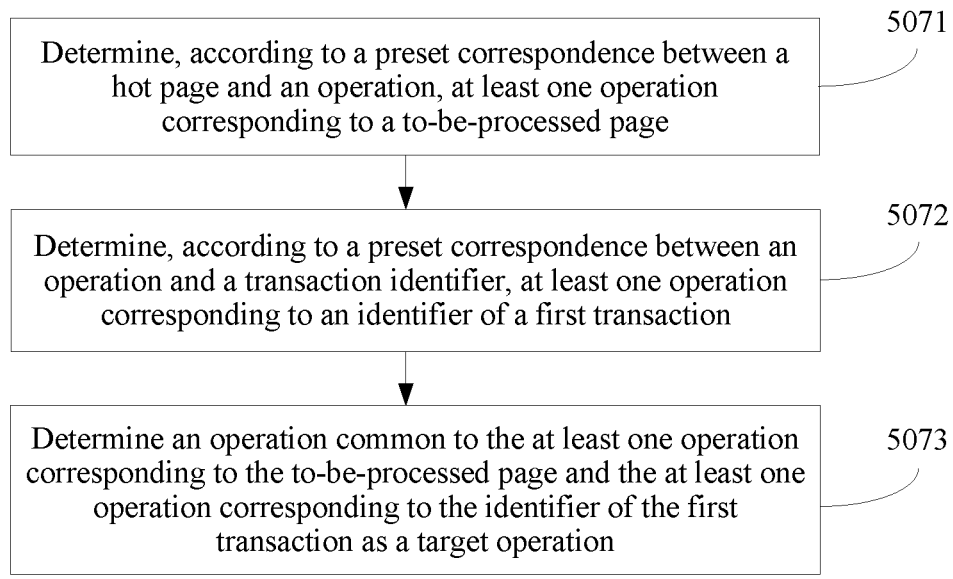
Figures 2, 3:
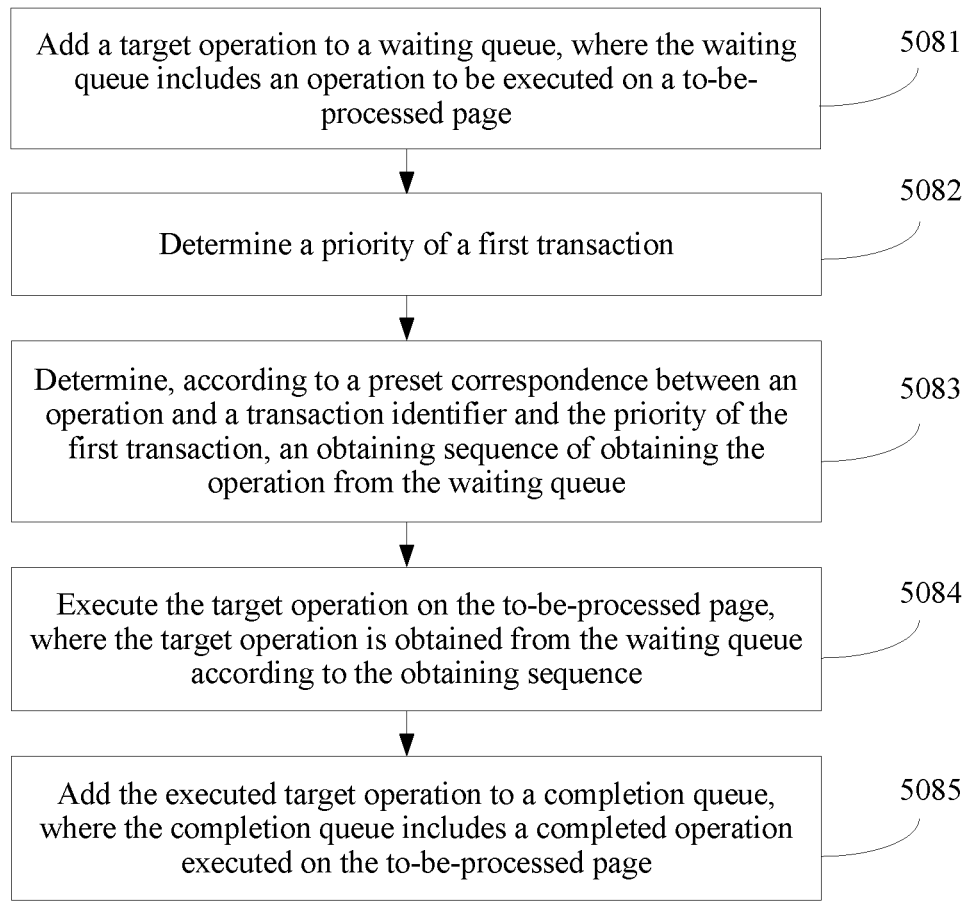

In some embodiments, as shown in FIG. 2-3, step 508 may include the following steps.

Step 5081: Add the target operation to a waiting queue, where the waiting queue includes an operation to be executed on the to-be-processed page.

The target operation p11 in step S073 is used as an example. When executing the target operation on the to-be-processed page, the CN may first add the target operation p11 to the waiting queue.

Step 5082: Determine a priority of the first transaction.

When establishing the correspondence between an operation and a transaction identifier, the CN may allocate a priority to each transaction. The priority may be represented by using a number, and a larger number indicates a higher transaction priority. Further, the correspondence between an operation and a transaction identifier may be further listed in Table 3. In Table 3, the priority of the first transaction T1 is higher than a priority of the second transaction T2, and is lower than a priority of the third transaction T3.

TABLE 3

| Transaction identifier | Operation | Transaction priority |
| --- | --- | --- |
| T1 | p11, p23, and p8 | 2 |
| T2 | p12 and p32 | 1 |
| T3 | p41, p51, and p61 | 3 |

Step 5083: Determine, according to a preset correspondence between an operation and a transaction identifier and the priority of the first transaction, an obtaining sequence of obtaining the operation from the waiting queue.

Optionally, the CN may determine, according to the preset correspondence between an operation and a transaction identifier, the priority of the first transaction, and a transaction priority corresponding to a remaining operation in the waiting queue, the obtaining sequence of obtaining the operation from the waiting queue. Table 3 is used as an example. It is assumed that the operation included in the waiting queue includes the target operation p11 and another operation p12, the priority of the first transaction T1 is 2, the priority of the second transaction T2 is 1, and the priority of the first transaction T1 is higher than the priority of the second transaction T2. It may be determined that the other operation p12 is obtained after the target operation p11 is first obtained from the waiting queue. It is assumed that the priority of the first transaction T1 is lower than the priority of the second transaction T2. It may be determined that the target operation p11 is obtained from the waiting queue after the other operation p12 is obtained from the waiting queue. It should be noted that, in addition to determining, according to the transaction priority, the obtaining sequence of obtaining the operation from the waiting queue, and further determining a sequence of executing operations, the CN may determine, according to another priority rule, the obtaining sequence of obtaining the operation from the waiting queue, and further determine the sequence of executing operations, so as to complete processing on the to-be-processed page, such as complexity of an operation process, and this embodiment in accordance with the present disclosure sets no limitation thereto.

Step 5084: Execute the target operation on the to-be-processed page, where the target operation is obtained from the waiting queue according to the obtaining sequence.

Optionally, the CN executes the target operation on the to-be-processed page, and the target operation is obtained from the waiting queue according to the obtaining sequence determined in step S083.

Step 5085: Add the executed target operation to a completion queue, where the completion queue includes a completed operation executed on the to-be-processed page.

Optionally, after executing the target operation on the to-be-processed page, the CN may add the executed target operation to the completion queue.

In a possible implementation, the to-be-processed page may include at least two lines of records, and the records are data tuples of the to-be-processed page. For example, the to-be-processed page is a page about personal information (such as name, age, gender, and enrollment date) of five employees in a company. Each line of information (that is, a record) corresponds to personal information of one employee. If two operations wait to be executed to process the to-be-processed page, and the two operations are corresponding to different transactions, and if the two operations are for processing records in different lines on the to-be-processed page, after an operation of a previous transaction is executed on the to-be-processed page, an operation of a next transaction may be directly executed on the to-be-processed page, with no need to wait for submission of the previous transaction. Therefore, a transaction execution capability and OLTP cluster database performance are improved. In the transaction execution method provided in this embodiment in accordance with the present disclosure, the CN can determine whether different transactions process records in a same line on the to-be-processed page. When different transactions process records in different lines on the to-be-processed page, after an operation of a previous transaction is executed on the to-be-processed page, an operation of a next transaction may be directly executed on the to-be-processed page. When different transactions are configured on a same PN, this process is equivalent to combining the different transactions configured on the same PN for processing.

Therefore, the transaction execution method may further include: after executing the target operation on the to-be-processed page, executing, by the CN, at least one other operation in the waiting queue on the to-be-processed page. The other operation and the target operation are for processing records in different lines on the to-be-processed page, and a transaction priority corresponding to the other operation is lower than the priority of the first transaction corresponding to the target operation.

For example, on the to-be-processed page, a record in the first line corresponds to personal information of an employee A, and a record in the second line corresponds to personal information of an employee B. It is assumed that the waiting queue includes two operations p11 and p12, the operation p11 corresponds to the first transaction T1, the operation p12 corresponds to the second transaction T2, and the priority of the second transaction T2 is lower than the priority of the first transaction T1. The operation p11 is an operation executed on the record in the first line on the to-be-processed page, that is, the operation p11 is an operation executed on the personal information of the employee A on the to-be-processed page, and the operation p12 is an operation executed on the record in the second line on the to-be-processed page, that is, the operation p12 is an operation executed on the personal information of the employee B on the to-be-processed page. After executing the operation p11 on the personal information of the employee A, the CN may directly obtain the operation p12 from the waiting queue, to execute the operation p12 on the personal information of the employee B, with no need to wait for submission of the first transaction T1.

Step 509: The CN sends the execution result to the first PN indicated by the identifier of the first PN.

After the CN executes the target operation on the to-be-processed page to obtain the execution result, the CN sends the execution result to the first PN indicated by the identifier of the first PN, so that the first PN submits the first transaction to the CN or rolls back the first transaction according to the execution result.

Step 510: The first PN generates a transaction processing message according to the execution result.

In a possible implementation, the first PN generates a transaction processing message according to the execution result. The transaction processing message is a transaction submission message or a transaction rollback message, the transaction submission message indicating that the first transaction needs to be submitted to the CN, and the transaction rollback message indicating that the first transaction needs to be rolled back. The first PN may establish a hot page processing structure in advance, and the hot page processing structure is used to store an execution result, of the to-be-processed page, subsequently sent by the CN. After receiving the execution result sent by the CN, the first PN may store the execution result in the hot page processing structure, and the first PN generates the transaction processing message according to the execution result in the hot page processing structure. In addition, in step 506, if the to-be-processed page indicated by the identifier of the to-be-processed page is the same as a hot page in the preset hot page set, the CN may further send a hot page notification message to the first PN. The hot page notification message indicating that the to-be-processed page indicated by the identifier of the to-be-processed page is the same as a hot page in the preset hot page set. The first PN may establish, according to the hot page notification message, a hot page processing structure corresponding to the to-be-processed page.

In a possible implementation, there may be three cases in which the first PN generates the transaction processing message according to the execution result in the hot page processing structure. In a first case, if the first PN determines, according to the execution result in the hot page processing structure, that all to-be-processed pages corresponding to the first transaction are successfully processed by the CN, the first PN generates a transaction submission message, and the transaction submission message indicating that the first transaction needs to be submitted to the CN. In a second case, if the first PN determines, according to the execution result in the hot page processing structure, that the CN fails to process a to-be-processed page, the first PN generates a transaction rollback message, and the transaction rollback message indicating that the first transaction needs to be rolled back. In a third case, if the first PN fails to receive, in a first preset time period, execution results of all to-be-processed pages that are corresponding to the first transaction and that are processed by the CN, the first PN may detect whether an execution result of a remaining to-be-processed page processed by the CN is received in a second preset time period, and if the first PN receives, in the second preset time period, the execution result of the remaining to-be-processed page processed by the CN, the first PN generates a transaction processing message according to the execution result; or if the first PN still fails to receive, in the second preset time period, the execution result of the remaining to-be-processed page processed by the CN, the first PN generates a transaction rollback message.

Table 1 and Table 2 are used as examples. In Table 1, the hot page y1 corresponds to the operations p11, p12, and p13, and the hot page y2 corresponds to the operations p21, p22, p23, and p24. In Table 2, the identifier T1 of the first transaction corresponds to three operations p11, p23, and p8. The page request message sent by the first PN to the CN includes an identifier y1 of a to-be-processed page, and the to-be-processed page y1 indicated by the identifier y1 of the to-be-processed page is the same as the hot page y1 in the preset hot page set. If the three operations of the first transaction is divisible and executable by the first PN and the CN (that is, p8 can be executed by the first PN, and p11 and p23 can be executed by the CN), the CN executes the target operation p11 on the to-be-processed page y1 to obtain an execution result, and sends the execution result to the first PN indicated by the identifier of the first PN. To complete execution of the first transaction, the first PN continues to send a page request message to the CN, including an identifier y2 of a to-be-processed page, and the to-be-processed page y2 indicated by the identifier y2 of the to-be-processed page is the same as the hot page y2 in the preset hot page set. If the three operations of the first transaction is divisible and executable by the first PN and the CN, the CN executes the target operation p23 on the to-be-processed page y2 to obtain an execution result, and sends the execution result to the first PN indicated by the identifier of the first PN. If it is the first case, that is, the first PN determines, according to two execution results, that all the to-be-processed pages corresponding to the first transaction are successfully processed by the CN, the first PN generates a transaction submission message. If it is the second case, for example, the first PN determines, according to two execution results, that the CN fails to process a to-be-processed page, the first PN generates a transaction rollback message. If it is the third case, for example, in the first preset time period, the first PN receives the execution result of the to-be-processed page y1, and fails to receive the execution result of the to-be-processed page y2, the first PN may detect whether the execution result of the to-be-processed page y2 is received in the second preset time period, and if the first PN receives the execution result of the to-be-processed page y2 in the second preset time period, the first PN generates a transaction processing message according to the two execution results and according to content described in the first case and the second case; or if the first PN still fails to receive the execution result of the to-be-processed page y2 in the second preset time period, the first PN generates a transaction rollback message.

It should be additionally noted that the page request message sent by the first PN to the CN may include an identifier of one to-be-processed page, or may include identifiers of multiple to-be-processed pages, and this is not limited in this embodiment in accordance with the present disclosure.

It should be further additionally noted that the CN may send an execution result of one to-be-processed page to the first PN indicated by the identifier of the first PN at a time, or may send execution results of at least two to-be-processed pages to the first PN indicated by the identifier of the first PN at a time, and this is not limited in this embodiment in accordance with the present disclosure.

Step 511: The first PN sends the transaction processing message to the CN.

In a possible implementation, after generating the transaction processing message according to the execution result, the first PN may send the transaction processing message to the CN. When the first PN generates a transaction submission message according to the execution result, the first PN sends the transaction submission message to the CN; or when the first PN generates a transaction rollback message according to the execution result, the first PN sends the transaction rollback message to the CN. For description of a specific process of step 511, refer to the prior art.

Step 512: The CN executes an action indicated by the transaction processing message.

In a possible implementation, when the first PN sends a transaction submission message to the CN, the CN saves modification on all the to-be-processed pages that are corresponding to the first transaction and that are processed by the CN, and sends a submission confirmation message and logs of the to-be-processed pages to the first PN; or when the first PN sends a transaction rollback message to the CN, the CN cancels modification on all the to-be-processed pages that are corresponding to the first transaction and that are processed by the CN, and sends a rollback confirmation message to the first PN.

It should be noted that when the transaction processing message is a transaction submission message, after executing an action indicated by the transaction submission message, the CN may further release a resource occupied by the target operation. For example, the resource may be storage space occupied by the target operation. In addition, the CN may further release a resource occupied by related information of the first transaction. The related information may include information such as the identifier of the first transaction and the priority of the first transaction. For description of a specific process in which the CN releases the resource occupied by the related information of the first transaction, refer to the prior art.

Step 513: If the operation of the first transaction is not divisible or executable by the first PN and the CN, the CN sends the to-be-processed page to the first PN. Step 514 is executed.

In a possible implementation, if the operation of the first transaction is not divisible or executable by the first PN and the CN, the CN sends the to-be-processed page to the first PN, so that the first PN executes an operation corresponding to the to-be-processed page on the to-be-processed page to obtain a processing result. If the operation of the first transaction is not divisible or executable by the first PN and the CN, the CN temporarily unlocks a corresponding hot page, and selects proper time to send the hot page (that is, the to-be-processed page) to the first PN, so that the first PN executes the operation corresponding to the to-be-processed page on the to-be-processed page to obtain the processing result. For a specific process in which the first PN executes the operation corresponding to the to-be-processed page on the to-be-processed page, refer to the prior art.

It should be additionally noted that after the first PN executes the operation corresponding to the to-be-processed page on the to-be-processed page, the CN may re-determine whether a quantity of times that the to-be-processed page is processed by a PN is greater than the preset processing threshold. When the quantity of times that the to-be-processed page is processed by a PN is greater than the preset processing threshold, the CN determines the to-be-processed page as a hot page, and the CN obtains the to-be-processed page, and stores the to-be-processed page in the preset hot page set. When the quantity of times that the to-be-processed page is processed by a PN is not greater than the preset processing threshold, the CN subsequently continues to use the prior art to process the to-be-processed page.

Step 514: The first PN executes an operation corresponding to the to-be-processed page on the to-be-processed page to obtain a processing result.

In a possible implementation, if the operation of the first transaction is not divisible or executable by the first PN and the CN, the CN sends the to-be-processed page to the first PN, and the first PN executes an operation corresponding to the to-be-processed page on the to-be-processed page to obtain a processing result. It is assumed that the preset hot page set includes three hot pages y1, y2, and y3, the hot page y1 corresponds to the operations p11, p12, and p13, the identifier T1 of the first transaction corresponds to three operations p11, p23 and p8, and the to-be-processed page is y1. If the CN detects, according to step 506, that the operation of the first transaction is not divisible or executable by the first PN and the CN, that is, the to-be-processed page y1 is not suitable for being executed by the CN, the CN sends the to-be-processed page y1 to the first PN, and the first PN executes an operation (that is, p11) corresponding to the to-be-processed page y1 on the to-be-processed page y1 to obtain a processing result, and generates a transaction processing message according to the processing result. For description of a specific process of step 514, refer to the prior art.

Step 515: If the to-be-processed page indicated by the identifier of the to-be-processed page is different from any hot page in the preset hot page set, the CN sends the page request message to a second PN, so that the second PN forwards the to-be-processed page to the first PN by using the CN.

In a possible implementation, the CN sends the page request message to the second PN, and the second PN is a holder of the to-be-processed page. Specifically, the CN sends the page request message to the second PN, the second PN sends the to-be-processed page to the CN according to the page request message, and then the CN sends the to-be-processed page to the first PN. After receiving the to-be-processed page, the first PN executes an operation corresponding to the to-be-processed page on the to-be-processed page to obtain a processing result, and generates a transaction processing message according to the processing result. For description of a specific process of step 515, refer to the prior art.

It should be noted that, to further improve a transaction execution capability and OLTP cluster database performance, a hot page in the preset hot page set may be periodically maintained. In a possible implementation, the transaction execution method may further include:

detecting, every a preset time period, whether a quantity of times that a first page on the n PNs is processed by a PN in the n PNs is greater than the preset processing threshold, where the first page is any page on the n PNs; and if the quantity of times that the first page is processed by a PN in the n PNs is greater than the preset processing threshold, storing the first page in the preset hot page set.

In the transaction execution method provided in this embodiment in accordance with the present disclosure, the CN can periodically determine a new hot page, and store a new hot page generated on a PN in a preset hot page set in time, so that the CN processes more hot pages. Transactions configured on different PNs are all processed on a CN end, to implement a function similar to single-point processing, and to fully utilize a redundant processing capability of the CN, thereby reducing page transfer overheads, and improving transaction execution efficiency. Further, a transaction execution capability and OLTP cluster database performance are improved.

In a possible implementation, the transaction execution method may further include:

detecting, every a preset time period, whether a quantity of times that a second page in the preset hot page set is processed by the CN is greater than the preset processing threshold, where the second page is any page in the preset hot page set; and if the quantity of times that the second page is processed by the CN is not greater than the preset processing threshold, removing the second page from the preset hot page set.

In the transaction execution method provided in this embodiment in accordance with the present disclosure, a CN can periodically remove a non-hot page from a preset hot page set, so as to improve a transaction execution capability and OLTP cluster database performance.

Figures 2, 3, 4:
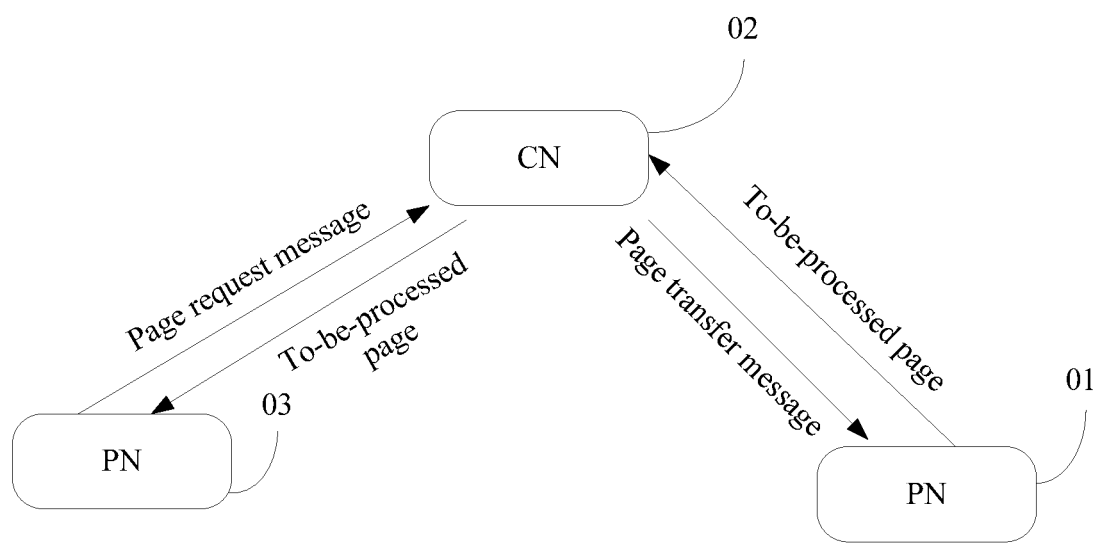

FIG. 2-4 shows a schematic diagram of an implementation environment related to a transaction execution method in the prior art. As shown in FIG. 2-4, each PN (for example, a PN 01) in an OLTP cluster database does not send a latest processed page to a CN 02 when submitting a transaction. After receiving a page request message sent by a PN 03, the CN 02 detects that a requested to-be-processed page is held by the PN 01, and the CN 02 sends a page transfer message to the PN 01. The PN 01 sends the to-be-processed page to the CN02, and then the CN 02 sends the to-be-processed page to the PN 03. When receiving the to-be-processed page, the PN 03 executes a corresponding operation on the to-be-processed page, for example, modifies or deletes a record in a line on the to-be-processed page. Finally, the PN 03 determines whether to submit the transaction according to processing results of all pages corresponding to the transaction. FIG. 2-5 is a flowchart of a transaction execution method in the prior art. As shown in FIG. 2-5, the transaction execution method includes the following steps.

Step 601: A first PN sends a transaction execution request message to a CN. Step 602 is executed.

The first PN is any PN in the n PNs. The first PN has a first transaction configured, and the transaction execution request message is generated by the first transaction.

Step 602: The CN sends a transaction information message to the first PN according to the transaction execution request message. Step 603 is executed.

The transaction information message includes an identifier of the first transaction.

Step 603: The first PN sends a page request message to the CN according to the transaction information message. Step 604 is executed.

The page request message includes an identifier of a to-be-processed page and an identifier of the first PN.

Step 604: The CN determines whether a to-be-processed page is on the CN according to the page request message. When the to-be-processed page is not on the CN, step 605 is executed; or when the to-be-processed page is on the CN, step 609 is executed.

Step 605: The CN sets the first PN as a holder of the to-be-processed page.

Step 606 is executed.

When the to-be-processed page is not on the CN, that is, when the to-be-processed page is on a storage unit such as a disk array, that is, if the to-be-processed page is never processed, the CN sets the first PN as the holder of the to-be-processed page.

Step 606: The CN sends a first indication message to the first PN. Step 607 is executed.

The first indication message indicating that the to-be-processed page is on the storage unit.

Step 607: The first PN reads the to-be-processed page from a storage unit according to the first indication message. Step 608 is executed.

Step 608: The first PN executes an operation corresponding to the to-be-processed page on the to-be-processed page. Step 610 is executed.

Step 609: The CN processes the to-be-processed page according to a state of the to-be-processed page. Step 610 is executed.

Step 609 may include content of the following three aspects:

In a first aspect, when the to-be-processed page is in an idle state, the CN sets the first PN as the holder of the to-be-processed page, and sends the to-be-processed page to the first PN.

In a second aspect, when the holder of the to-be-processed page is the first PN, the CN enables the first PN to add an operation corresponding to the to-be-processed page to a local waiting queue. The to-be-processed page waits to be obtained for the operation corresponding to the to-be-processed page.

In a third aspect, when the holder of the to-be-processed page is not the first PN, for example, the holder of the to-be-processed page is a second PN, and the second PN is a PN in the n PNs except the first PN, the CN enables the first PN to add an operation corresponding to the to-be-processed page to a local waiting queue, and the CN sends a second indication message to the first PN. The second indication message indicating that the holder of the to-be-processed page is the second PN. In addition, the CN sends the page request message to the second PN, and the second PN processes the to-be-processed page according to the page request message. When a processing result meets a page transfer condition, the second PN sends the to-be-processed page to the CN, and then the CN sends the to-be-processed page to the first PN. After receiving the to-be-processed page, the first PN executes a corresponding operation on the to-be-processed page.

A remaining to-be-processed page corresponding to the first transaction continues to be processed according to step 603 to step 609.

Step 610: The first PN generates a transaction processing message according to processing results of all pages corresponding to a first transaction. Step 611 is executed.

The transaction processing message is a transaction submission message or a transaction rollback message. A transaction is an operation sequence, and the operation sequence is an inseparable work unit. Therefore, when the first PN detects that all the pages corresponding to the first transaction are successfully processed, the first PN generates a transaction submission message; or when the first PN detects that a page in all the pages corresponding to the first transaction fails to be processed, the first PN generates a transaction rollback message.

Step 611: The first PN sends the transaction processing message to the CN. Step 612 is executed.

Step 612: The CN executes an action indicated by the transaction processing message. Step 613 is executed.

When the first PN sends a transaction submission message to the CN, the CN saves modification on all the pages corresponding to the first transaction; or when the first PN sends a transaction rollback message to the CN, the CN cancels modification on all the pages corresponding to the first transaction.

Step 613: The CN sends a transaction processing determining message to the first PN.

The transaction processing determining message is a submission confirmation message and a rollback confirmation message. After saving the modification on all the pages corresponding to the first transaction, the CN sends a submission confirmation message to the first PN; or after cancelling the modification on all the pages corresponding to the first transaction, the CN sends a rollback confirmation message to the first PN.

It should be noted that, when content in the first aspect and content in the second aspect in step 609 are completed by using the transaction execution method in the prior art, the to-be-processed page may be directly obtained from the CN, and does not need to be transferred between the PN and the CN. Therefore, a transaction execution delay is relatively small. However, when content in the third aspect in step 609 is completed, the to-be-processed page needs to be transferred between the PN and the CN. Therefore, a transaction execution delay is excessively large, and the delay may be 300 times of a delay generated when a page is not transferred. The transaction execution method in the prior art is operation step-oriented task decomposition, and a distribution situation in data running is not considered. Therefore, in a scenario with high concurrency and intense conflicts, page contention causes rapidly increased page transfer overheads. An implementation of the transaction execution method in the prior art has relatively low complexity. In a scenario with high concurrency and intense conflicts, transaction execution efficiency is relatively low and in addition, a computing resource of the CN cannot be fully used.

In the transaction execution method provided in this embodiment in accordance with the present disclosure, a CN can enable a hot page to be always on the CN. When a transaction requires the hot page to be processed, the CN processes some operations related to the hot page. The CN can properly schedule all transactions with a hot page waiting to be processed, and details are as follows. (1) The CN can combine transactions configured on a same PN for processing, that is, when determining that records in different lines on a same to-be-processed page are processed for different transactions on the same PN, the CN may continue to process the to-be-processed page according to a next transaction after processing the to-be-processed page according to a previous transaction. (2) The CN can process all transactions configured on different PNs, so as to implement a function similar to single node processing. (3) When a transaction needs to be submitted to the CN, the CN can properly obtain an operation in a local waiting queue, for example, obtain an operation in the waiting queue according to a priority of the transaction corresponding to the operation. The CN can periodically scan a preset hot page set, and store a new hot page on a PN in the preset hot page set, and remove, from the preset hot page set, a page whose quantity of times of being processed by the CN is not greater than a preset processing threshold. A remaining page obtained after the removal is processed according to the prior art. A read operation process is completed by periodically refreshing a page on a PN or by using a cache mechanism. A read operation does not require data modification. Therefore, to avoid mutual blocking between a read operation and a write operation, the CN may send a version of a data page visible to a current corresponding transaction to a PN that is used as a read operation requesting node. During a transaction execution process, the CN can deliver a hot page in the preset hot page set to a PN that has a transaction configured, and then completes the transaction execution process according to the prior art. After the transaction is submitted, the PN then sends the hot page to the CN, and the CN manages the hot page.

The transaction execution method provided in this embodiment in accordance with the present disclosure is applicable to a scenario with high concurrency and intense conflicts. In the scenario with high concurrency and intense conflicts, page contention causes rapidly increased page transfer overheads. In the transaction execution method provided in this embodiment in accordance with the present disclosure, a CN processes all hot pages, so that hot page conflicts between transactions are properly processed together. In the method, a redundant processing capability of the CN is fully used, that is, a computing resource of the CN is fully used, and this improves hot page processing efficiency, reduces page transfer overheads, and improves page transfer efficiency needed for the transaction. In addition, the CN fully learns global information of an entire OLTP cluster database system. Therefore, the CN can efficiently coordinate and schedule transactions, to implement various optimization processing. By changing a transaction execution manner, scalability and performance stability of an entire OLTP cluster database are improved in the scenario with high concurrency and intense conflicts.

FIG. 2-6 shows a schematic diagram of an implementation environment related to a transaction execution method in the prior art. FIG. 2-7 shows a schematic diagram of an implementation environment related to a transaction execution method according to an embodiment in accordance with the present disclosure.

The implementation environment shown in FIG. 2-6 includes a CN 02 and two PNs (that is, a PN 03 and a PN 01). The PN 03 and the PN 01 share a storage unit 04, the PN 03 stores a page 1, a page 2, a page 3, and the like, and the PN 01 stores a page 4, a page 5, a page 6, and the like. A quantity of times that the page 4 is processed by a PN is greater than a preset processing threshold, that is, the page 4 is a hot page.

The implementation environment shown in FIG. 2-7 includes a CN 02 and two PNs (that is, a PN 03 and a PN 01). The PN 03 and the PN 01 share a storage unit 04. It is assumed that the PN 03 has a first transaction T1 and a second transaction T2 configured, and the PN 03 stores a page 1, a page 2, a page 3, and the like. It is assumed that the PN 01 has a third transaction T3, a fourth transaction T4, and a fifth transaction T5 configured, and the PN 01 stores a page 5, a page 6, and the like. Different from that in FIG. 2-6, the CN 02 in FIG. 2-7 stores a hot page 4 of the PN 01 on the CN 02. In FIG. 2-7, the CN 02 further stores a correspondence between a hot page and an operation. As shown in FIG. 2-7, the hot page 4 corresponds to operations t1', t2', t3', t4', and t5'. t1' is an operation that is stripped from the first transaction T1 and that corresponds to the hot page 4, t2' is an operation that is stripped from the second transaction T2 and that corresponds to the hot page 4, t3' is an operation that is stripped from the third transaction T3 and that corresponds to the hot page 4, t4' is an operation that is stripped from the fourth transaction T4 and that corresponds to the hot page 4, and t5' is an operation that is stripped from the fifth transaction T5 and that corresponds to the hot page 4. When the first transaction T1 sends a page request message corresponding to the hot page 4 to the CN 02, if a transaction is executed in the implementation environment shown in FIG. 2-6, to complete processing on the hot page 4, a schematic page transfer diagram corresponding to a transaction execution process is shown in FIG. 2-4, and the hot page 4 needs to be transferred among the CN 02, the PN 01, and the PN 03. If a transaction is executed in the implementation environment shown in FIG. 2-7, to complete processing on the hot page 4, a schematic diagram corresponding to a transaction execution process is shown in FIG. 2-8, and the CN executes the target operation t1' on the hot page 4 (that is, a to-be-processed page) to obtain an execution result. The hot page 4 does not need to be transferred between the CN and a PN. It can be learned from FIG. 2-4 and FIG. 2-8 that, in the transaction execution method provided in this embodiment in accordance with the present disclosure, page transfer overheads in a scenario with high concurrency and intense conflicts are reduced, and transaction execution efficiency is improved. Therefore, a transaction execution capability and OLTP cluster database performance are improved.

It should be noted that a sequence of the steps of the transaction execution method provided in this embodiment in accordance with the present disclosure may be adjusted properly, and a step may also be added or removed as needed. Any person skilled in the art may readily figure out modified methods without departing from the present disclosure, and therefore, details are not described again.

In conclusion, according to the transaction execution method provided in this embodiment in accordance with the present disclosure, after a CN receives a page request message sent by a PN, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, improving transfer efficiency of a page needed for a transaction, and improving transaction execution efficiency. Therefore, a transaction execution capability and OLTP cluster database performance are improved, and scalability and performance stability of an entire OLTP cluster database are improved in a scenario with high concurrency and intense conflicts.

The following is an apparatus embodiment in accordance with the present disclosure, and the apparatus embodiment may be used to execute the method embodiment in accordance with the present disclosure. For details not disclosed in the apparatus embodiment in accordance with the present disclosure, refer to the method embodiment in accordance with the present disclosure.

FIG. 3-1 is a schematic structural diagram of a transaction execution apparatus according to an embodiment in accordance with the present disclosure. The transaction execution apparatus may implement a part or all of a CN of an OLTP cluster database by using software, hardware, or a combination of the software and the hardware. The OLTP cluster database includes n PNs and one CN, where n is greater than or equal to 1, and the apparatus includes:

a receiving unit 310, configured to receive a page request message sent by a first PN, where the first PN is any PN in the n PNs, the first PN has a first transaction configured, the first transaction includes at least one operation, and the page request message includes an identifier of a to-be-processed page and an identifier of the first PN;

a determining unit 320, configured to: if the to-be-processed page indicated by the identifier of the to-be-processed page is the same as a hot page in a preset hot page set, determine a target operation corresponding to the to-be-processed page, where the preset hot page set includes at least one hot page, the hot page is a page that has been processed by a PN in the n PNs a number of times that is greater than a preset processing threshold, and the target operation is an operation selected from the at least one operation according to the hot page that is the same as the to-be-processed page;

an execution unit 330, configured to execute the target operation on the to-be-processed page to obtain an execution result; and a sending unit 340, configured to send the execution result of the to-be-processed page to the first PN indicated by the identifier of the first PN, so that the first PN submits the first transaction to the CN or rolls back the first transaction according to the execution result.

In a possible implementation, the determining unit 320 is specifically configured to: if the to-be-processed page indicated by the identifier of the to-be-processed page is the same as a hot page in the preset hot page set, detect whether an operation of the first transaction is divisible and executable by the first PN and the CN; and if the operation of the first transaction is divisible and executable by the first PN and the CN, determine the target operation corresponding to the to-be-processed page.

In a possible implementation, the execution unit 330 is specifically configured to: add the target operation to a waiting queue, where the waiting queue includes an operation to be executed on the to-be-processed page; determine a priority of the first transaction; determine, according to a preset correspondence between an operation and a transaction identifier and the priority of the first transaction, an obtaining sequence of obtaining the operation from the waiting queue; execute the target operation on the to-be-processed page, where the target operation is obtained from the waiting queue according to the obtaining sequence; and add the executed target operation to a completion queue, where the completion queue includes a completed operation executed on the to-be-processed page.

In a possible implementation, the to-be-processed page includes at least two lines of records. As shown in FIG. 3-2, the apparatus further includes:

a first selection unit 350, configured to: after the target operation is executed on the to-be-processed page, execute at least one other operation in the waiting queue on the to-be-processed page, where the other operation and the target operation are for processing records in different lines on the to-be-processed page, and a transaction priority corresponding to the other operation is lower than the priority of the first transaction corresponding to the target operation.

In a possible implementation, as shown in FIG. 3-2, the apparatus further includes:

a second selection unit 360, configured to obtain, from the n PNs, m pages whose quantity of times of being processed by a PN in the n PNs is greater than the preset processing threshold, where m is greater than or equal to 1; and an establishment unit 370, configured to establish the preset hot page set, where the preset hot page set includes the m pages.

In a possible implementation, the page request message further includes an identifier of the first transaction; and the determining unit 320 is specifically configured to: determine, according to a preset correspondence between a hot page and an operation, at least one operation corresponding to the to-be-processed page, where the preset correspondence between a hot page and an operation records an operation corresponding to each hot page in the preset hot page set; determine, according to a preset correspondence between an operation and a transaction identifier, at least one operation corresponding to the identifier of the first transaction; and determine an operation common to the at least one operation corresponding to the to-be-processed page and the at least one operation corresponding to the identifier of the first transaction as the target operation.

In a possible implementation, the receiving unit 310 is further configured to receive a transaction processing message sent by the first PN. The transaction processing message is a transaction submission message or a transaction rollback message, the transaction submission message indicating that the first transaction needs to be submitted to the CN, the transaction rollback message indicating that the first transaction needs to be rolled back, and the transaction processing message is generated by the first PN according to the execution result.

The execution unit 330 is further configured to execute an action indicated by the transaction processing message.

In a possible implementation, as shown in FIG. 3-2, the apparatus further includes:

a first detection unit 380, configured to detect, every a preset time period, whether a quantity of times that a first page on the n PNs is processed by a PN in the n PNs is greater than the preset processing threshold, where the first page is any page on then PNs; and a storage unit 390, configured to: if the quantity of times that the first page is processed by a PN in the n PNs is greater than the preset processing threshold, store the first page in the preset hot page set.

In a possible implementation, as shown in FIG. 3-2, the apparatus further includes:

a second detection unit 410, configured to detect, every a preset time period, whether a quantity of times that a second page in the preset hot page set is processed by the CN is greater than the preset processing threshold, where the second page is any page in the preset hot page set; and a removal unit 420, configured to: if the quantity of times that the second page is processed by the CN is not greater than the preset processing threshold, remove the second page from the preset hot page set.

In a possible implementation, the sending unit 340 is further configured to: if the operation of the first transaction is not divisible or executable by the first PN and the CN, send the to-be-processed page to the first PN, so that the first PN executes an operation corresponding to the to-be-processed page on the to-be-processed page to obtain a processing result.

In conclusion, according to the transaction execution apparatus provided in this embodiment in accordance with the present disclosure, after a CN receives a page request message sent by a PN, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, improving transfer efficiency of a page needed for a transaction, and improving transaction execution efficiency. Therefore, a transaction execution capability and OLTP cluster database performance are improved, and scalability and performance stability of an entire OLTP cluster database are improved in a scenario with high concurrency and intense conflicts.

FIG. 4 is a schematic structural diagram of a transaction execution apparatus according to an embodiment in accordance with the present disclosure. The transaction execution apparatus may implement a part or all of a first PN of an OLTP cluster database by using software, hardware, or a combination of the software and the hardware. The OLTP cluster database includes n PNs and one CN, where n is greater than or equal to 1, and the first PN is any PN in the n PNs. The transaction execution apparatus may include:

a sending unit 410, configured to send a page request message to the CN, where the first PN has a first transaction configured, the first transaction includes at least one operation, and the page request message includes an identifier of a to-be-processed page and an identifier of the first PN;

a receiving unit 420, configured to receive an execution result, of the to-be-processed page, sent by the CN, where if the to-be-processed page indicated by the identifier of the to-be-processed page is the same as a hot page in a preset hot page set, the execution result is obtained after a target operation is executed on the to-be-processed page; and a processing unit 430, configured to: submit the first transaction to the CN or roll back the first transaction according to the execution result.

In a possible implementation, the processing unit 430 is specifically configured to:

generate a transaction processing message according to the execution result, where the transaction processing message is a transaction submission message or a transaction rollback message, the transaction submission message indicating that the first transaction needs to be submitted to the CN, and the transaction rollback message indicating that the first transaction needs to be rolled back; and send the transaction processing message to the CN, so that the CN executes an action indicated by the transaction processing message.

In a possible implementation, the receiving unit 420 is further configured to receive the to-be-processed page sent by the CN, and the to-be-processed page indicated by the identifier of the to-be-processed page is the same as a hot page in the preset hot page set, and an operation of the first transaction is not divisible or executable by the first PN and the CN.

The processing unit 430 is further configured to execute an operation corresponding to the to-be-processed page on the to-be-processed page to obtain a processing result.

In conclusion, according to the transaction execution apparatus provided in this embodiment in accordance with the present disclosure, a PN sends a page request message to a CN. Therefore, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, improving transfer efficiency of a page needed for a transaction, and improving transaction execution efficiency. Therefore, a transaction execution capability and OLTP cluster database performance are improved, and scalability and performance stability of an entire OLTP cluster database are improved in a scenario with high concurrency and intense conflicts.

Figures 2, 3, 4, 5:
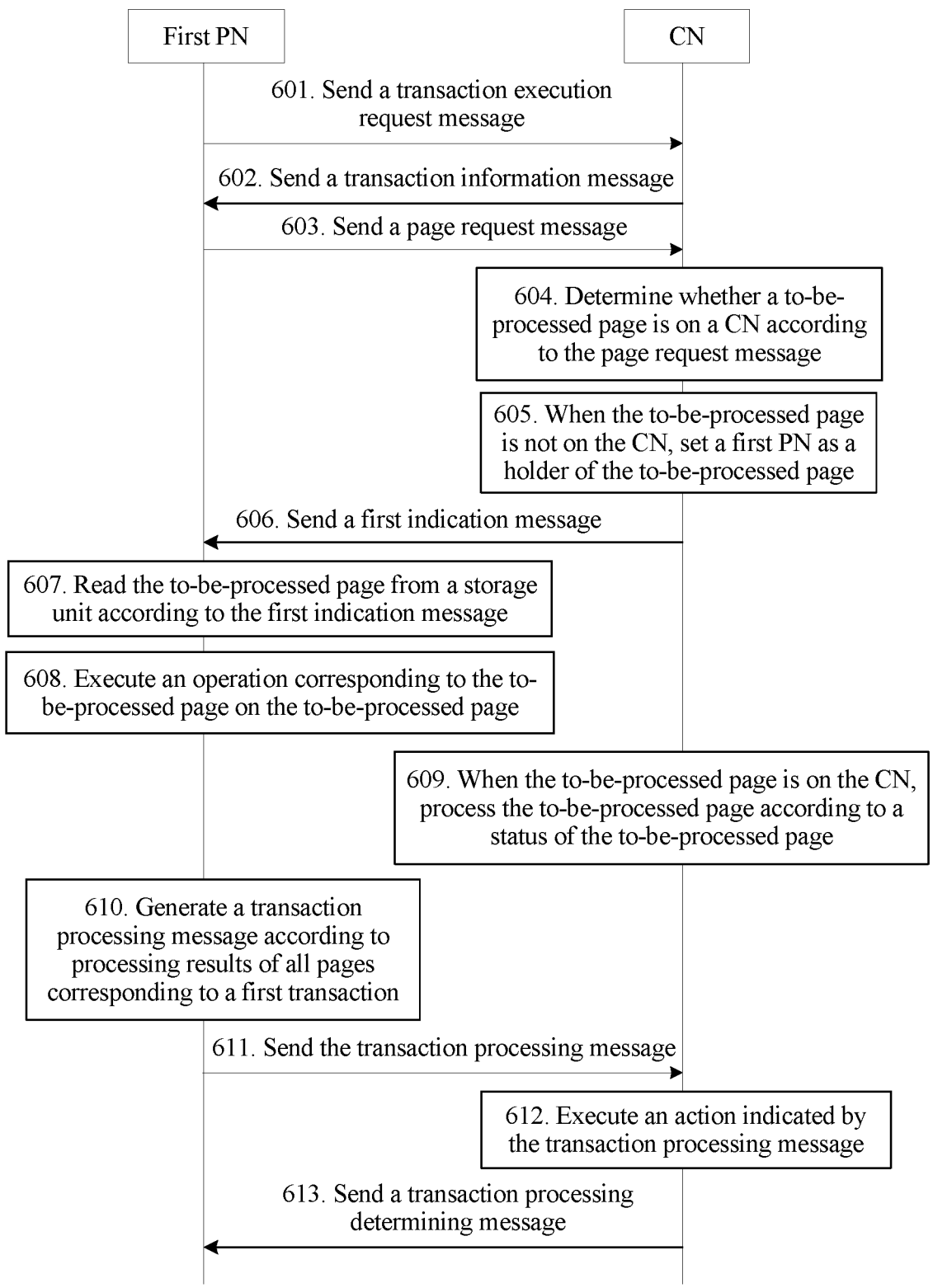

FIG. 5 is a schematic structural diagram of a transaction execution apparatus according to an embodiment in accordance with the present disclosure. The transaction execution apparatus is applied to a CN of an OLTP cluster database, and the OLTP cluster database includes n PNs and one CN, where n is greater than or equal to 1. The apparatus includes a processor 801, a memory 802, a network interface 803, and a bus 804. The bus 804 is configured to connect the processor 801, the memory 802, and the network interface 803, and the processor 801 is configured to execute a program 8021 stored in the memory 802. The receiving unit 310 and the sending unit 340 in FIG. 3-1 above may be implemented by the network interface 803. The determining unit 320 and the execution unit 330 in FIG. 3-1, and the first selection unit 350, the second selection unit 360, the establishment unit 370, the first detection unit 380, the storage unit 390, the second detection unit 410, and the removal unit 420 in FIG. 3-2 may be implemented by the program 8021 that is stored in the memory 802 and that is executed by the processor 801.

The memory 802 may include a random access memory (RAM), or may include a non-volatile memory, for example, at least one magnetic disk storage. Communications connection between the CN and the PN is implemented by using the network interface 803 (which may be wired or wireless). The processor 801 may execute the program 8021 stored in the memory 802 to implement the CN in the OLTP cluster database, so that the CN executes the following transaction execution method:

receiving a page request message sent by a first PN, where the first PN is any PN in the n PNs, the first PN has a first transaction configured, the first transaction includes at least one operation, and the page request message includes an identifier of a to-be-processed page and an identifier of the first PN;

determining a target operation corresponding to the to-be-processed page if the to-be-processed page indicated by the identifier of the to-be-processed page is the same as a hot page in a preset hot page set, where the preset hot page set includes at least one hot page, the hot page is a page that has been processed by a PN in the n PNs a number of times that is greater than a preset processing threshold, and the target operation is an operation selected from the at least one operation according to the hot page that is the same as the to-be-processed page;

executing the target operation on the to-be-processed page to obtain an execution result; and sending the execution result to the first PN indicated by the identifier of the first PN, so that the first PN submits the first transaction to the CN or rolls back the first transaction according to the execution result.

Optionally, the determining a target operation corresponding to the to-be-processed page if the to-be-processed page indicated by the identifier of the to-be-processed page is the same as a hot page in a preset hot page set includes:

if the to-be-processed page indicated by the identifier of the to-be-processed page is the same as a hot page in the preset hot page set, detecting whether an operation of the first transaction is divisible and executable by the first PN and the CN; and if the operation of the first transaction is divisible and executable by the first PN and the CN, determining the target operation corresponding to the to-be-processed page.

Optionally, the executing the target operation on the to-be-processed page to obtain an execution result includes:

adding the target operation to a waiting queue, where the waiting queue includes an operation to be executed on the to-be-processed page;

determining a priority of the first transaction;

determining, according to a preset correspondence between an operation and a transaction identifier and the priority of the first transaction, an obtaining sequence of obtaining the operation from the waiting queue;

executing the target operation on the to-be-processed page, where the target operation is obtained from the waiting queue according to the obtaining sequence; and adding the executed target operation to a completion queue, where the completion queue includes a completed operation executed on the to-be-processed page.

Optionally, the to-be-processed page includes at least two lines of records, and the method further includes:

after executing the target operation on the to-be-processed page, executing at least one other operation in the waiting queue on the to-be-processed page, where the other operation and the target operation are for processing records in different lines on the to-be-processed page, and a transaction priority corresponding to the other operation is lower than the priority of the first transaction corresponding to the target operation.

Optionally, the method further includes:

obtaining, from the n PNs, m pages whose quantity of times of being processed by a PN in the n PNs is greater than the preset processing threshold, where m is greater than or equal to 1; and establishing the preset hot page set, where the preset hot page set includes the m pages.

Optionally, the page request message further includes an identifier of the first transaction; and the determining a target operation corresponding to the to-be-processed page includes:

determining, according to a preset correspondence between a hot page and an operation, at least one operation corresponding to the to-be-processed page, where the preset correspondence between a hot page and an operation records an operation corresponding to each hot page in the preset hot page set;

determining, according to a preset correspondence between an operation and a transaction identifier, at least one operation corresponding to the identifier of the first transaction; and determining an operation common to the at least one operation corresponding to the to-be-processed page and the at least one operation corresponding to the identifier of the first transaction as the target operation.

Optionally, after the sending the execution result to the first PN indicated by the identifier of the first PN, the method further includes:

receiving a transaction processing message sent by the first PN, where the transaction processing message is a transaction submission message or a transaction rollback message, the transaction submission message indicating that the first transaction needs to be submitted to the CN, the transaction rollback message indicating that the first transaction needs to be rolled back, and the transaction processing message is generated by the first PN according to the execution result; and executing an action indicated by the transaction processing message.

Optionally, the method further includes:

detecting, every a preset time period, whether a quantity of times that a first page on the n PNs is processed by a PN in the n PNs is greater than the preset processing threshold, where the first page is any page on the n PNs; and if the quantity of times that the first page is processed by a PN in the n PNs is greater than the preset processing threshold, storing the first page in the preset hot page set.

Optionally, the method further includes:

detecting, every a preset time period, whether a quantity of times that a second page in the preset hot page set is processed by the CN is greater than the preset processing threshold, where the second page is any page in the preset hot page set; and if the quantity of times that the second page is processed by the CN is not greater than the preset processing threshold, removing the second page from the preset hot page set.

Optionally, the method further includes:

if the operation of the first transaction is not divisible or executable by the first PN and the CN, sending the to-be-processed page to the first PN, so that the first PN executes an operation corresponding to the to-be-processed page on the to-be-processed page to obtain a processing result.

In conclusion, according to the transaction execution apparatus provided in this embodiment in accordance with the present disclosure, after a CN receives a page request message sent by a PN, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, improving transfer efficiency of a page needed for a transaction, and improving transaction execution efficiency. Therefore, a transaction execution capability and OLTP cluster database performance are improved, and scalability and performance stability of an entire OLTP cluster database are improved in a scenario with high concurrency and intense conflicts.

Figures 2, 3, 4, 5, 6:
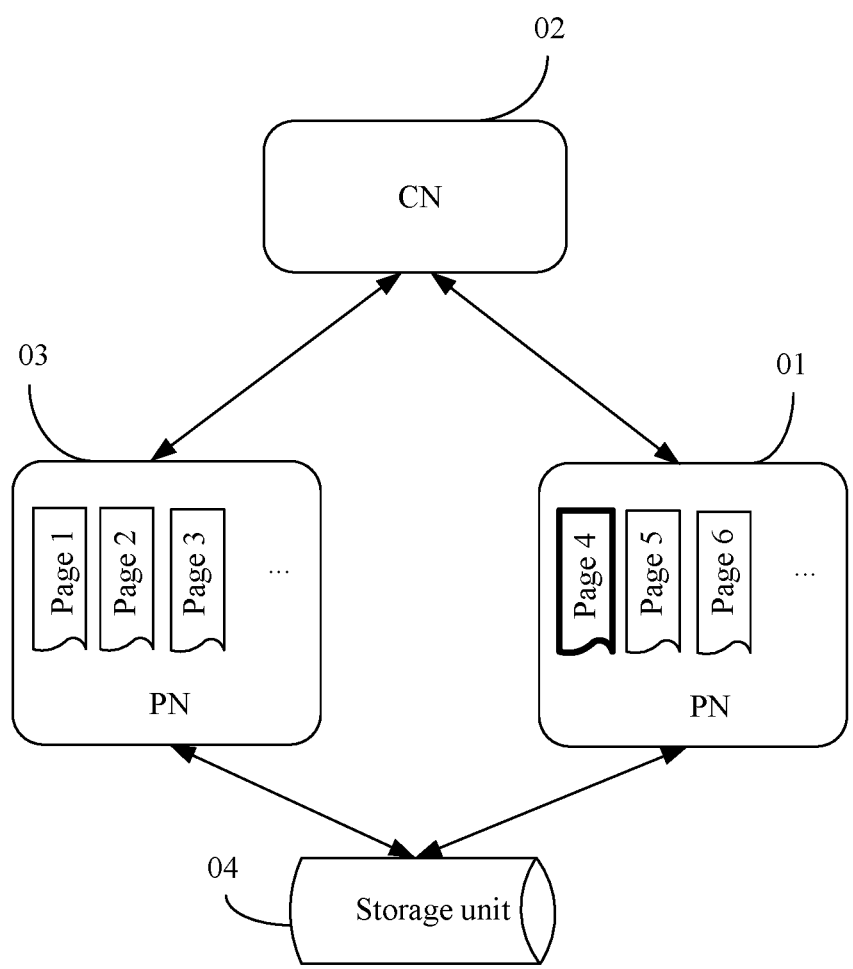
Figures 2, 3, 4, 5, 6, 7:
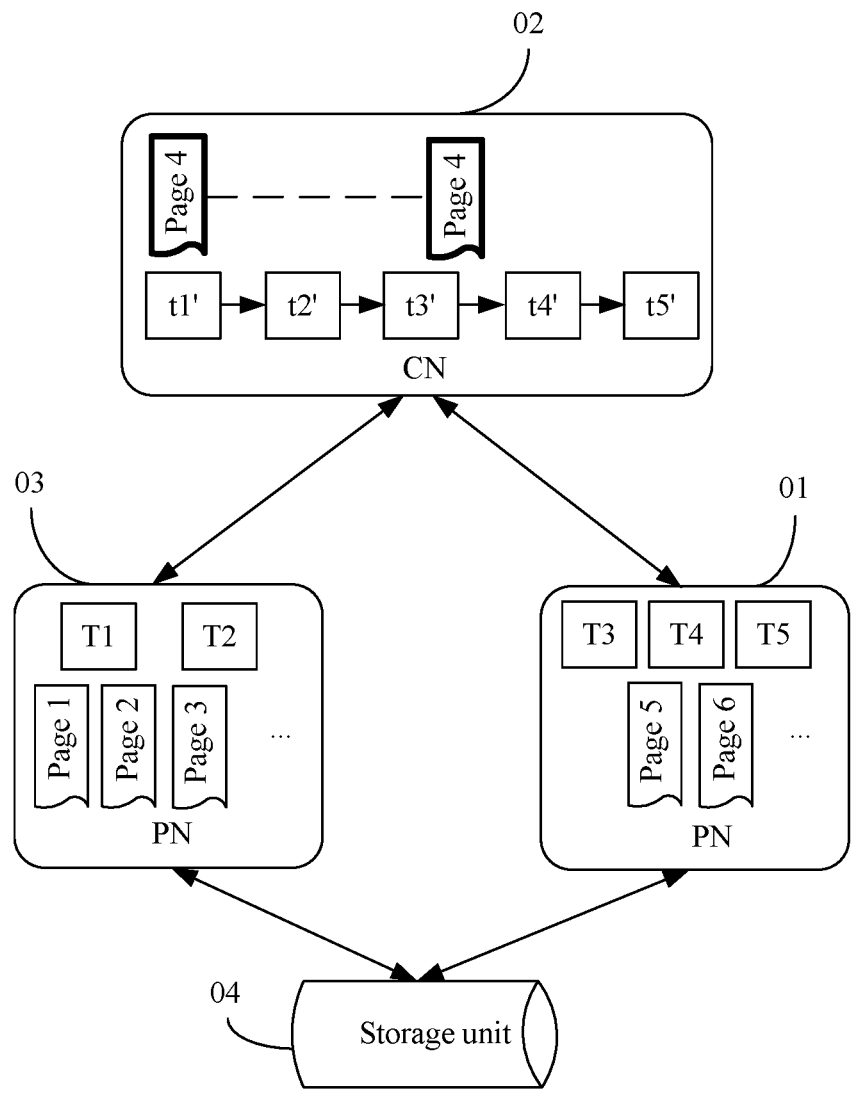
Figures 2, 3, 4, 5, 6, 7, 8:
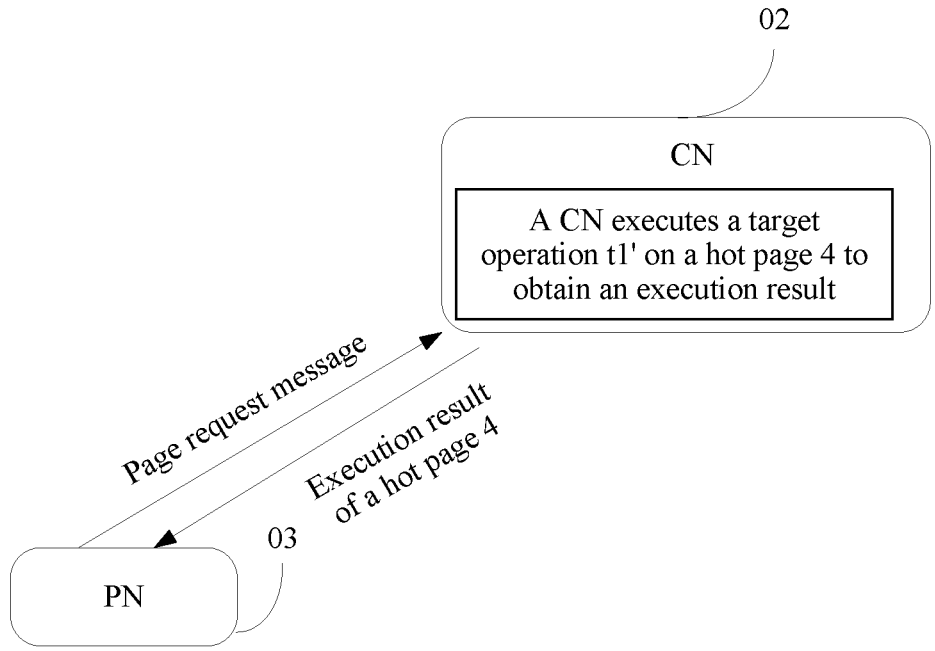
Figures 1, 3:
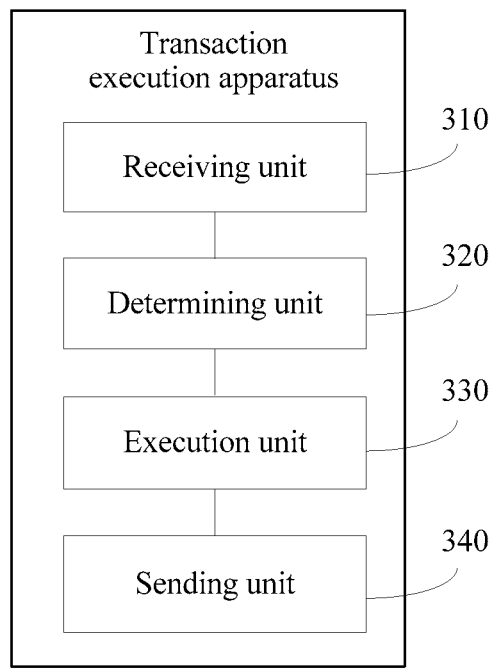
Figures 2, 3:
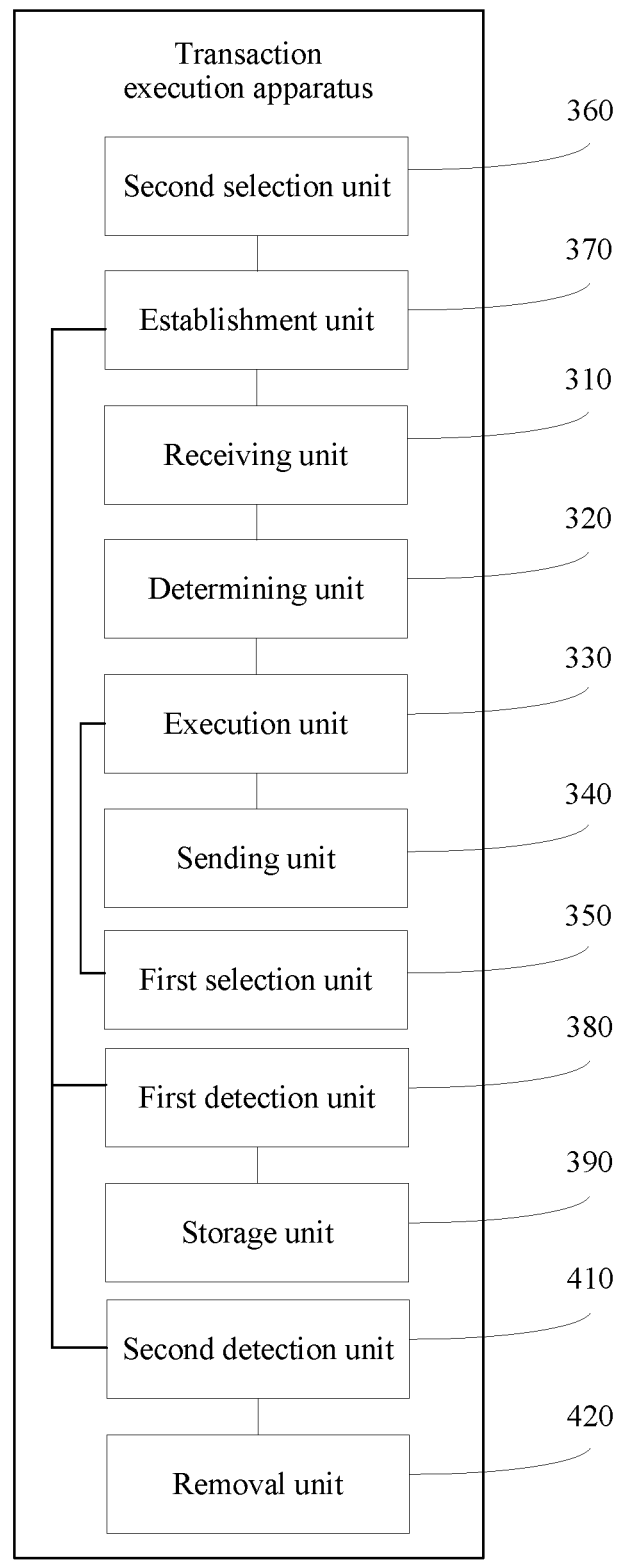
Figure 4:
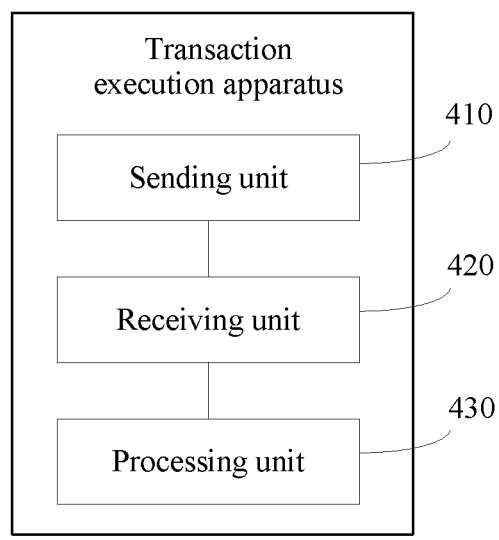
Figure 5:
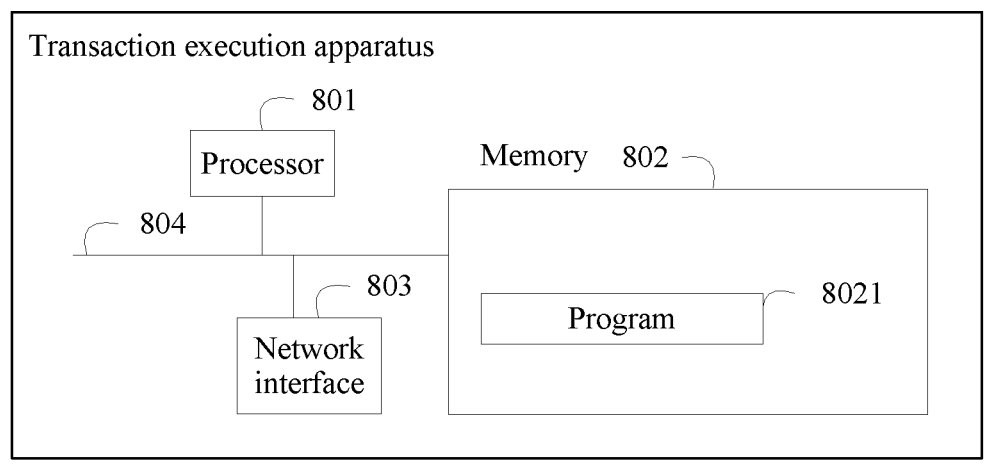
Figure 6:
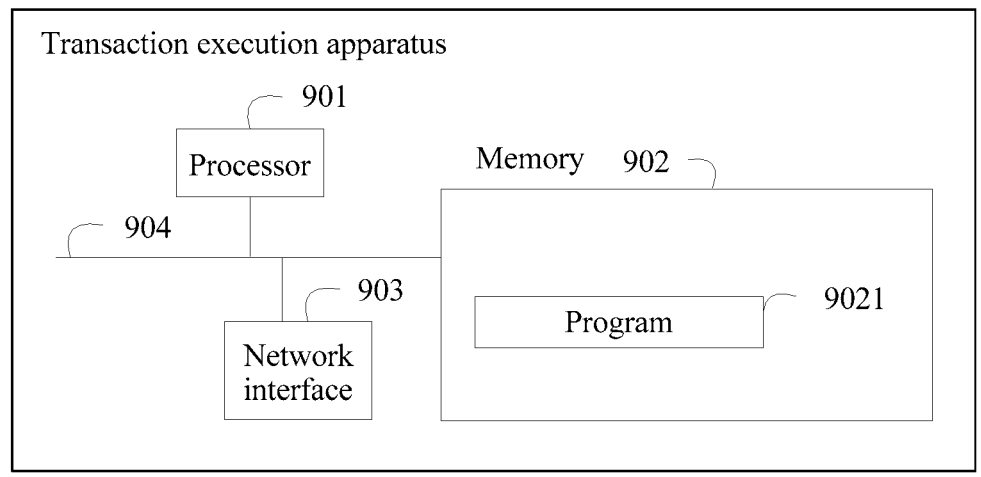

FIG. 6 is a schematic structural diagram of a transaction execution apparatus according to an embodiment in accordance with the present disclosure. The transaction execution apparatus is applied to a first PN of an OLTP cluster database, and the OLTP cluster database includes n PNs and one CN, where n is greater than or equal to 1. The first PN is any PN in the n PNs. The apparatus includes a processor 901, a memory 902, a network interface 903, and a bus 904. The bus 904 is configured to connect the processor 901, the memory 902, and the network interface 903, and the processor 901 is configured to execute a program 9021 stored in the memory 902. The sending unit 410 and the receiving unit 420 in FIG. 4 above may be implemented by the network interface 903. The processing unit 430 in FIG. 4 may be implemented by the program 9021 that is stored in the memory 902 and that is executed by the processor 901.

The memory 902 may include a random access memory, or may include a non-volatile memory, for example, at least one magnetic disk storage. Communications connection between the PN and the CN is implemented by using the network interface 903 (which may be wired or wireless). The processor 901 may execute the program 9021 stored in the memory 902 to implement the first PN in the OLTP cluster database, so that the first PN executes the following transaction execution method:

sending a page request message to the CN, where the first PN has a first transaction configured, the first transaction includes at least one operation, and the page request message includes an identifier of a to-be-processed page and an identifier of the first PN;

receiving an execution result, of the to-be-processed page, sent by the CN, where if the to-be-processed page indicated by the identifier of the to-be-processed page is the same as a hot page in a preset hot page set, the execution result is obtained after a target operation is executed on the to-be-processed page; and submitting the first transaction to the CN or rolling back the first transaction according to the execution result.

Optionally, the submitting the first transaction to the CN or rolling back the first transaction according to the execution result includes:

generating a transaction processing message according to the execution result, where the transaction processing message is a transaction submission message or a transaction rollback message, the transaction submission message indicating that the first transaction needs to be submitted to the CN, and the transaction rollback message indicating that the first transaction needs to be rolled back; and sending the transaction processing message to the CN, so that the CN executes an action indicated by the transaction processing message.

Optionally, the method further includes:

receiving the to-be-processed page sent by the CN, where the to-be-processed page indicated by the identifier of the to-be-processed page is the same as a hot page in the preset hot page set, and an operation of the first transaction is not divisible or executable by the first PN and the CN; and executing an operation corresponding to the to-be-processed page on the to-be-processed page to obtain a processing result.

In conclusion, according to the transaction execution apparatus provided in this embodiment in accordance with the present disclosure, a PN sends a page request message to a CN. Therefore, if a to-be-processed page indicated by an identifier of the to-be-processed page is the same as a hot page in a preset hot page set, the CN can execute a target operation on the to-be-processed page, so that the to-be-processed page does not need to be frequently transferred between the PN and the CN, thereby reducing page transfer overheads, improving transfer efficiency of a page needed for a transaction, and improving transaction execution efficiency. Therefore, a transaction execution capability and OLTP cluster database performance are improved, and scalability and performance stability of an entire OLTP cluster database are improved in a scenario with high concurrency and intense conflicts.

An embodiment in accordance with the present disclosure provides a transaction execution system, including a CN and a first PN.

The CN includes the transaction execution apparatus shown in FIG. 3-1 or FIG. 3-2.

The first PN includes the transaction execution apparatus shown in FIG. 4.

An embodiment in accordance with the present disclosure provides another transaction execution system, including a CN and a first PN.

The CN includes the transaction execution apparatus shown in FIG. 5.

The first PN includes the transaction execution apparatus shown in FIG. 6.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in embodiments in accordance with the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely example embodiments of the present application, but are not intended to limit the present application. Any modification, equivalent replacement, and improvement made without departing from the spirit and principle of the present disclosure shall fall within the scope of the present disclosure.

What is claimed is:

1. A transaction execution method, applied to a coordinator node (CN) of an online transaction processing (OLTP) cluster database, wherein the OLTP cluster database comprises n data processing nodes (PN) and one CN, wherein n is greater than or equal to 1, and the method comprises:
   receiving a page request message sent by a first PN, wherein the first PN is any PN in the n PNs, and the first PN has a first transaction configured, the first transaction comprising at least one operation, and the page request message comprising an identifier of a first page and an identifier of the first PN;
   determining a target operation corresponding to the first page if the first page indicated by the identifier of the first page is the same as a hot page in a preset hot page set, wherein the preset hot page set comprises at least one hot page, the hot page being a page that has been processed by a PN in the n PNs a number of times that is greater than a preset processing threshold, and the target operation is an operation selected from the at least one operation according to the hot page that is the same as the first page;
   executing the target operation on the first page to obtain an execution result; and
   sending the execution result to the first PN indicated by the identifier of the first PN, so that the first PN submits the first transaction to the CN or rolls back the first transaction according to the execution result.

2. The method according to claim 1, wherein determining the target operation corresponding to the first page if the first page indicated by the identifier of the first page is the same as a hot page in a preset hot page set comprises:
   if the first page indicated by the identifier of the first page is the same as a hot page in the preset hot page set, detecting whether an operation of the first transaction is divisible and executable by the first PN and the CN; and
   if the operation of the first transaction is divisible and executable by the first PN and the CN, determining the target operation corresponding to the first page.

3. The method according to claim 1, wherein the executing the target operation on the first page to obtain an execution result comprises:
   adding the target operation to a waiting queue, wherein the waiting queue comprises an operation to be executed on the first page;
   determining a priority of the first transaction;
   determining, according to a preset correspondence between an operation and a transaction identifier and the priority of the first transaction, an obtaining sequence of obtaining the operation from the waiting queue;
   executing the target operation on the first page, wherein the target operation is obtained from the waiting queue according to the obtaining sequence; and
   adding the executed target operation to a completion queue, wherein the completion queue comprises a completed operation executed on the first page.

4. The method according to claim 3, wherein the first page comprises at least two lines of records, and the method further comprises:
   after executing the target operation on the first page, executing at least one other operation in the waiting queue on the first page, wherein
   the other operation and the target operation are for processing records in different lines on the first page, and a transaction priority corresponding to the other operation is lower than the priority of the first transaction corresponding to the target operation.

5. The method according to claim 1, wherein the method further comprises:
   obtaining, from the n PNs, m pages whose quantity of times of being processed by a PN in the n PNs is greater than the preset processing threshold, wherein m is greater than or equal to 1; and
   establishing the preset hot page set, wherein the preset hot page set comprises the m pages.

6. The method according to claim 1, wherein the page request message further comprises an identifier of the first transaction; and the determining a target operation corresponding to the first page comprises:
   determining, according to a preset correspondence between a hot page and an operation, at least one operation corresponding to the first page, wherein the preset correspondence between a hot page and an operation records an operation corresponding to each hot page in the preset hot page set;

determining, according to a preset correspondence between an operation and a transaction identifier, at least one operation corresponding to the identifier of the first transaction; and determining an operation common to the at least one operation corresponding to the first page and the at least one operation corresponding to the identifier of the first transaction as the target operation.

7. The method according to claim 1, after sending the execution result to the first PN indicated by the identifier of the first PN, the method further comprises:

receiving a transaction processing message sent by the first PN, wherein the transaction processing message is a transaction submission message or a transaction rollback message, the transaction submission message indicating that the first transaction needs to be submitted to the CN, the transaction rollback message indicating that the first transaction needs to be rolled back, and the transaction processing message being generated by the first PN according to the execution result; and executing an action indicated by the transaction processing message.

8. The method according to claim 5, wherein the method further comprises:

detecting, every a preset time period, whether a quantity of times that a second page on the n PNs is processed by a PN in the n PNs is greater than the preset processing threshold, wherein the second page is any page on the n PNs; and if the quantity of times that the second page is processed by a PN in the n PNs is greater than the preset processing threshold, storing the second page in the preset hot page set.

9. The method according to claim 5, wherein the method further comprises:

detecting, every a preset time period, whether a quantity of times that a second page in the preset hot page set is processed by the CN is greater than the preset processing threshold, wherein the second page is any page in the preset hot page set; and if the quantity of times that the second page is processed by the CN is not greater than the preset processing threshold, removing the second page from the preset hot page set.

10. The method according to claim 2, wherein the method further comprises:

if the operation of the first transaction is not divisible or executable by the first PN and the CN, sending the first page to the first PN, so that the first PN executes an operation corresponding to the first page on the first page to obtain a processing result.

11. A transaction execution method, applied to a first data processing node PN of an online transaction processing OLTP cluster database, wherein the OLTP cluster database comprises n PNs and one coordinator node CN, wherein n is greater than or equal to 1, and the first PN is any PN in the n PNs; and the method comprises:

sending a page request message to the CN, wherein the first PN has a first transaction configured, the first transaction comprises at least one operation, and the page request message comprises an identifier of a first page and an identifier of the first PN;

receiving an execution result, of the first page, sent by the CN, wherein if the first page indicated by the identifier of the first page is the same as a hot page in a preset hot page set, the execution result is obtained after a target operation is executed on the first page; and submitting the first transaction to the CN or rolling back the first transaction according to the execution result.

12. The method according to claim 11, wherein the submitting the first transaction to the CN or rolling back the first transaction according to the execution result comprises:

generating a transaction processing message according to the execution result, wherein the transaction processing message is a transaction submission message or a transaction rollback message, the transaction submission message indicating that the first transaction needs to be submitted to the CN, and the transaction rollback message indicating that the first transaction needs to be rolled back; and sending the transaction processing message to the CN, so that the CN executes an action indicated by the transaction processing message.

13. The method according to claim 11, wherein the method further comprises:

receiving the first page sent by the CN, wherein the first page indicated by the identifier of the first page is the same as a hot page in the preset hot page set, and an operation of the first transaction is not divisible or executable by the first PN and the CN; and executing an operation corresponding to the first page on the first page to obtain a processing result.

14. A transaction execution apparatus, applied to a coordinator node CN of an online transaction processing OLTP cluster database, wherein the OLTP cluster database comprises n data processing nodes PNs and one CN, wherein n is greater than or equal to 1; and the apparatus comprises a processor, a memory, a network interface, and a bus, the bus is configured to connect the processor, the memory, and the network interface, the processor is configured to execute a program stored in the memory, and the program comprises the transaction execution method, wherein the method comprising:

receiving a page request message sent by a first PN, wherein the first PN is any PN in the n PNs, and the first PN has a first transaction configured, the first transaction comprising at least one operation, and the page request message comprising an identifier of a first page and an identifier of the first PN;

determining a target operation corresponding to the first page if the first page indicated by the identifier of the first page is the same as a hot page in a preset hot page set, wherein the preset hot page set comprises at least one hot page, the hot page being a page that has been processed by a PN in the n PNs a number of times that is greater than a preset processing threshold, and the target operation being an operation selected from the at least one operation according to the hot page that is the same as the first page;

executing the target operation on the first page to obtain an execution result; and sending the execution result to the first PN indicated by the identifier of the first PN, so that the first PN submits the first transaction to the CN or rolls back the first transaction according to the execution result.

15. A transaction execution apparatus, applied to a first data processing node PN of an online transaction processing OLTP cluster database, wherein the OLTP cluster database comprises n PNs and one coordinator node CN, wherein n is greater than or equal to 1, and the first PN is any PN in the n PNs; and the apparatus comprises a processor, a memory, a network interface, and a bus, the bus is configured to connect the processor, the memory, and the network interface, the processor is configured to execute a program stored in the memory, and the program comprises the transaction execution method, wherein the method comprising:

sending a page request message to the CN, wherein the first PN has a first transaction configured, the first transaction comprises at least one operation, and the page request message comprises an identifier of a first page and an identifier of the first PN;

receiving an execution result, of the first page, sent by the CN, wherein if the first page indicated by the identifier of the first page is the same as a hot page in a preset hot page set, the execution result is obtained after a target operation is executed on the first page; and submitting the first transaction to the CN or rolling back the first transaction according to the execution result.

16. The apparatus according to claim 14, wherein determining the target operation corresponding to the first page if the first page indicated by the identifier of the first page is the same as a hot page in a preset hot page set comprises:

if the first page indicated by the identifier of the first page is the same as a hot page in the preset hot page set, detecting whether an operation of the first transaction is divisible and executable by the first PN and the CN; and if the operation of the first transaction is divisible and executable by the first PN and the CN, determining the target operation corresponding to the first page.

17. The apparatus according to claim 14, wherein the executing the target operation on the first page to obtain an execution result comprises:

adding the target operation to a waiting queue, wherein the waiting queue comprises an operation to be executed on the first page;

determining a priority of the first transaction;

determining, according to a preset correspondence between an operation and a transaction identifier and the priority of the first transaction, an obtaining sequence of obtaining the operation from the waiting queue;

executing the target operation on the first page, wherein the target operation is obtained from the waiting queue according to the obtaining sequence; and adding the executed target operation to a completion queue, wherein the completion queue comprises a completed operation executed on the first page.

18. The apparatus according to claim 17, wherein the first page comprises at least two lines of records, and the method further comprises:

after executing the target operation on the first page, executing at least one other operation in the waiting queue on the first page, wherein the other operation and the target operation are for processing records in different lines on the first page, and a transaction priority corresponding to the other operation is lower than the priority of the first transaction corresponding to the target operation.

19. The apparatus according to claim 15, wherein the submitting the first transaction to the CN or rolling back the first transaction according to the execution result comprises:

generating a transaction processing message according to the execution result, wherein the transaction processing message is a transaction submission message or a transaction rollback message, the transaction submission message indicating that the first transaction needs to be submitted to the CN, and the transaction rollback message indicating that the first transaction needs to be rolled back; and sending the transaction processing message to the CN, so that the CN executes an action indicated by the transaction processing message.

20. The apparatus according to claim 15, wherein the method further comprises:

receiving the first page sent by the CN, wherein the first page indicated by the identifier of the first page is the same as a hot page in the preset hot page set, and an operation of the first transaction is not divisible or executable by the first PN and the CN; and executing an operation corresponding to the first page on the first page to obtain a processing result.

\* \* \* \* \*